(12) United States Patent
Mitsch

(10) Patent No.: US 11,603,821 B2
(45) Date of Patent: Mar. 14, 2023

(54) ROTATION DAMPER AND VIBRATION ABSORBER EQUIPPED THEREWITH

(71) Applicant: FM ENERGIE GMBH & CO. KG, Heppenheim (DE)

(72) Inventor: Franz Mitsch, Heppenheim (DE)

(73) Assignee: FM ENERGIE GMBH & CO. KG, Heppenheim (DE)

( * ) Notice: Subject to any disclaimer, the term of this patent is extended or adjusted under 35 U.S.C. 154(b) by 374 days.

(21) Appl. No.: 16/636,120

(22) PCT Filed: Aug. 3, 2018

(86) PCT No.: PCT/EP2018/000384
§ 371 (c)(1),
(2) Date: Feb. 3, 2020

(87) PCT Pub. No.: WO2019/029839
PCT Pub. Date: Feb. 14, 2019

(65) Prior Publication Data
US 2020/0284240 A1 Sep. 10, 2020

(30) Foreign Application Priority Data
Aug. 8, 2017 (DE) .................... 17001353.6

(51) Int. Cl.
*F16F 7/10* (2006.01)
*F03D 80/00* (2016.01)
*F03D 13/20* (2016.01)

(52) U.S. Cl.
CPC ............. *F03D 13/20* (2016.05); *F03D 80/00* (2016.05); *F16F 7/1022* (2013.01);
(Continued)

(58) Field of Classification Search
CPC .......... F16F 7/1022; F16F 7/10; F16F 7/1005; F16F 7/1011; F16F 7/1017; F16F 7/104;
(Continued)

(56) References Cited

U.S. PATENT DOCUMENTS 5,272,847 A * 12/1993 Abiru ................. E04H 9/0215
52/167.2
10,718,232 B2 * 7/2020 Mitsch ................. F16F 7/1011
(Continued)

FOREIGN PATENT DOCUMENTS

CN 111954771 A * 11/2020 .......... E04H 9/0215
DE 37 41 578 A1 6/1988
(Continued)

OTHER PUBLICATIONS

International Search Report Corresponding to PCT/EP2018/000384 dated Nov. 19, 2018.
(Continued)

*Primary Examiner* — Thomas J Williams
(74) *Attorney, Agent, or Firm* — Finch & Maloney PLLC

(57) ABSTRACT

A novel rotation vibration damper and to vibration absorbers having the damper for wind turbines or other high and, relative to the height thereof, narrow installations or buildings. The disclosure particularly relates to vibration absorbers comprising at least one oscillating mass on a pendulum cable or pendulum rod, wherein the mass is caused to vibrate by an excitation frequency which can be damped by a rotation damper and, in particular, a rotating eddy current magnet damper which forms part of the absorber.

22 Claims, 16 Drawing Sheets

(52) U.S. Cl.
CPC ... *F05B 2240/912* (2013.01); *F05B 2260/964* (2013.01); *F16F 7/10* (2013.01); *F16F 2222/06* (2013.01); *F16F 2232/06* (2013.01)

(58) Field of Classification Search
CPC .......... F16F 15/03; F16F 15/035; F16F 15/28; F16F 15/31; F16F 2222/06; F16F 2222/08; F16F 2232/06; F16F 2260/964
See application file for complete search history.

(56) References Cited

U.S. PATENT DOCUMENTS

| | | | |
|---|---|---|---|
| 11,255,409 B2 * | 2/2022 | Mitsch | .................... F03D 1/00 |
| 2007/0131504 A1 | 6/2007 | Bronowicki et al. | |
| 2017/0219045 A1 | 8/2017 | Glanzner | |
| 2018/0252287 A1 * | 9/2018 | Mitsch | ................ E04H 9/0215 |
| 2019/0024535 A1 | 1/2019 | Mitsch | |

FOREIGN PATENT DOCUMENTS

| | | | | |
|---|---|---|---|---|
| EP | 0349979 A1 | * | 10/1990 | ........... E04H 9/0215 |
| EP | 0853197 A1 | * | 7/1998 | ............ F16F 15/035 |
| EP | 1 008 747 A2 | | 6/2000 | |
| EP | 2 378 118 A2 | | 10/2011 | |
| EP | 2 696 072 A1 | | 2/2014 | |
| EP | 2 681 463 B1 | | 5/2015 | |
| JP | 3837701 B2 | * | 10/2006 | |
| WO | 2009/068599 A2 | | 6/2009 | |
| WO | WO-2012121694 A1 | * | 9/2012 | ............ E04B 1/985 |
| WO | 2016/023628 A1 | | 2/2016 | |
| WO | 2017/121633 A1 | | 7/2017 | |
| WO | WO-2019154557 A1 | * | 8/2019 | ........... E04H 9/0215 |
| WO | WO-2020030579 A1 | * | 2/2020 | ........... F16F 15/035 |

OTHER PUBLICATIONS

Written Opinion Corresponding to PCT/EP2018/000384 dated Nov. 19, 2018.

* cited by examiner (a)

(b)

B-B ( 1 : 5 )

ROTATION DAMPER AND VIBRATION ABSORBER EQUIPPED THEREWITH

FIELD OF THE INVENTION

The invention relates to a novel rotation damper and to a vibration absorber containing this damper for wind turbines or other tall installations or buildings which are narrow relative to their height.

In particular, the invention relates to a vibration absorber comprising at least one swinging mass on at least one pendulum cable or pendulum rod, where the mass set swinging by a natural frequency can be damped by a rotation damper according to the invention as part of the absorber.

BACKGROUND OF THE INVENTION

Tall and slim buildings and installations are subjected to particular vibration conditions which have to be addressed by technical measures in order that no damage or premature fatigue processes occur. This applies, in particular, to wind turbines, which, owing to their rapid technical development in recent years, are increasingly also being employed in more extreme locations (e.g. offshore) and heights, and in addition have ever-higher towers in order to utilise the better wind conditions there. Such wind turbines have to withstand the forces acting on them due to wind, waves, weather and operation, which load the installations to different extents at different points. Vibration forces in particular can endanger the operation and safety of the installations.

Not only in operation, but also during erection of the wind turbine or a tall tower, vibrations due to wind or other forces occur which can endanger the construction, especially since installations under construction have not yet been adapted optimally to interfering vibrations of this type. During the erection of wind turbines, firstly the tower is erected in segments. The nacelle with rotor is subsequently installed. The situation without nacelle (tower stump alone) must be regarded as critical with respect to resonance excitation, since greater vibration amplitudes can arise in this state than is the case with nacelle. Vibration absorbers for such purposes are always placed on and bolted to the end of the uppermost tower segment. This operation is repeated until the tower has been completely erected and the nacelle can be put in place. The natural frequency of the installation drops with increasing assembly progress. It must therefore be possible to adapt the absorber frequency easily in a broad range (approx. factor 2) and the absorber frequency is generally at a higher level compared with the fully erected installation.

It is therefore necessary to damp the vibrations occurring in these installations specifically and effectively by technical measures. This is carried out by means of vibration absorbers or vibration dampers of various design in accordance with the diverse, various fields of use.

Most interfering forces also act on the tower of the installation, which is generally stimulated to vibrate with a low natural frequency of usually <1 Hz. For this reason, pendulum absorbers, which are usually suspended in the tower, are often employed for vibration damping in the prior art.

Pendulum absorbers for wind turbines are known in the prior art.

Thus, EP 1008747 (B1) describes a pendulum absorber which has an elastic damping element in the pendulum joint bearing.

WO 2009/068599 describes a pendulum absorber in which the vibrations of the pendulum mass are damped by frictional damping by means of diverse plates. In this solution, the problem of considerable evolution of heat occurs, which is evident from damping changing with temperature. Similar difficulties arise on use of fluid dampers.

All these solutions additionally have the disadvantage that only small swing distances can be covered owing to the small space available for movement of the pendulum in the tower, which has the consequence that the absorber masses necessary must be quite large in order to be able to influence the corresponding natural frequency and the damping.

In order to counter this, magnetic or eddy current dampers in combination with pendulum absorbers have been proposed. In conventional magnetic dampers, the damping takes place by attraction or repulsion of magnets having the opposite or same polarity moved past one another. Eddy current dampers are functionally based on the induction of a current in an electrical conductor which is moved by a changing magnetic field. The resultant eddy currents in turn form magnetic fields, which counters the original magnetic field and brakes the movement of the conductor. If the speed with which the conductor moves in the magnetic field increases, the eddy current in the conductor is increased, which leads to a stronger magnetic field, causing the movement to be braked further and more strongly.

Magnetic or eddy current dampers are known as such in the prior art.

Thus, DE 37 41 578 A1 describes a vibration damping device for precision machines which is based on the movement of a plate between the north and south poles of a magnetic field.

US 2007/0131504 describes a planar vibration damper in which a transversal pendulum device is moved in the field of magnetic fields in a planar arrangement.

EP 2 696 072 describes a vibration absorber arrangement for wind turbines having a mass pendulum and a plate-form magnet and conductor element, where a sliding arrangement, in particular a sliding layer, intended to ensure a compact design of the absorber with only low temperature dependence, has been introduced between the elements. In the event of vibration, the mass pendulum is guided in preferably two vibration devices, with movement of the conductor plate relative to the magnet plate taking place at the lower end of the mass pendulum.

The said magnetic dampers have the disadvantage that they are usually very direction-dependent and cannot be twisted axially. In addition, it is often impossible to achieve adequately high damping densities with them at acceptable effort, although these are vital on use of wind turbines, in particular of wind turbines with towers having a height of 100 m or more.

WO 2016/023628 describes an eddy current vibration damper which is able to achieve higher damping densities and in addition is direction-independent. The damper essentially consists of a cylindrical tube, which has a magnet arrangement, and a conductor tube, which is guided and movable in the interior. The two tubes are guided in a friction-free manner in the region of the magnet arrangement, with, in a preferred embodiment, the guiding of the conductor tube relative to the magnetic cylindrical tube being carried out by a roller device outside the functional region.

All known magnetic or eddy current dampers have the property that the counterforce which generates the eddy current field and is opposite to the movement of the mass is dependent on the speed of movement. However, since slow movements are often generated by the excitation frequency (wind, earthquakes etc.) in tall towers, as in the case of wind turbines or also in tall buildings, the problem arises that the eddy current field force generated is insufficient to achieve adequate damping in the case of especially slow movements. The same applies if the amplitudes of the vibration are low. This can be helped by increasing the magnetic density, for example by an increased number of magnet elements generally or per unit area. However, this increases not only the costs, but also the requisite space requirement, which is often not available, especially in the towers of wind turbines. In general, however, the magnet elements become warm to hot during operation in the case of a small design, which leads to a reduction in the temperature independence of the damper, since significantly more heat forms in a tight space due to the increased vibration energy.

The object was therefore to provide magnetic dampers for damping natural frequencies of below 30 Hz, in particular below 10 Hz, preferably between 0.15 and 5 Hz, in particular between 0.5 and 5 Hz, preferably between 0.15 and 2 Hz, in tall and slim buildings and industrial installations, in particular in wind turbines, which no longer have the disadvantages described, in particular the rather low damping in the case of states with low kinetic energy.

The object has been achieved by the provision of the eddy current dampers specified below and in claims, and of vibration absorbers which contain dampers of this type.

SUMMARY OF THE INVENTION

The object has been achieved, in particular, by the movement, linear per se, of the swinging mass of a pendulum absorber being converted into a rotational movement by corresponding design measures, where the achievable speed of rotation can be a multiple of the linear speed of the moved mass through the choice of a correspondingly large, preferably rotationally symmetrical rotation element. Attachment of damping/braking devices to the rotation element thus enables an increased damping effect to be achieved.

In particular if use is made of an eddy current damping system, in which conductor elements and magnet elements are moved relative to one another by rotation, it is possible to generate a high damping effect which is dependent on the speed of rotation. As already mentioned, the speed of the rotational movement is the crucial factor for the damping effect to be achieved in the eddy current principle applied here. In accordance with the invention, it is therefore possible, depending on the design, to achieve a speed of the rotating conductor elements of approximately 2-20 times that of the fixed magnet elements (or vice versa) and thus 4-400 times the damping effect (linear damping constant: N×s/m) for the same number of magnets compared with the known eddy current dampers.

Furthermore, the increased heat generated in a rotating system of this type can be dissipated more easily owing to the higher movement speed, if necessary also with the aid of passive or active cooling devices, such as cooling ribs or cooling fins on the rotating discs, wheels or internal gear wheels used, which alone provide for a cooling swirl of air, similar to a fan, through their rotations.

However, it is also possible in accordance with the invention to achieve a comparable braking effect if, for example, the eddy current damping arrangement preferably proposed here is replaced by another braking device, such as, for example, a conventional magnetic damping device (through magnetic attraction and repulsion), or a frictional damper device or fluid damper device, in the rotation element of the vibration absorber according to the invention.

The invention thus relates to a rotation vibration absorber for damping vibrations of a structure or construction, in particular of a wind turbine, generated by an excitation frequency, in combination with a swingable mass (7) as constituent of a vibration absorber arrangement,
where the damping device (10) essentially has the following components a supporting construction (4),
(ii) a transport device (2) which
is accommodated on or in the supporting construction (4),
is connected to the swinging mass (7) or to the structure (9) to be damped,
can be moved to and fro in a linear manner in one direction on excitation by the mass (7), and
is capable of converting the linear movement into a rotational movement,
(iii) a connecting element (3), which is on the one hand attached to the transport device (2) and on the other hand is connected to the swinging mass (7) or to the structure (9) to be damped, and
a connecting element (6), which is connected on the one hand to the supporting construction (4) and on the other hand, if the swinging mass (7) is connected to the connecting element (3), to the to the structure (9) to be damped, or alternatively is connected to the swinging mass (7) if the structure (9) to be damped is connected to the connecting element (3), and
(iv) at least one damping arrangement (1) which is responsible for the actual damping, is functionally connected to the transport device (2) and essentially comprises:
at least one first, preferably rotationally symmetrical element (1.1) which rotates in operation,
a fixed second, preferably rotationally symmetrical element (1.2) which is arranged opposite the first element and is connected to the supporting construction (4), and
damping elements (1.3) between the said first and second elements for an eddy current damping arrangement (1.4), a frictional damping arrangement (1.5), a fluid damper arrangement (1.6) or a conventional magnetic damping arrangement (1.7),
where the damping occurs due to the relative rotational movement of the first element (1.1) with respect to the second element (1.2), and the rotating first element (1.1) is driven by the corresponding linear movement of the transport device (2).

The invention relates, in particular, to a corresponding rotation vibration damper which contains damping elements (1.4) for an eddy current damping arrangement, and is thus an eddy current damping device, and the damping elements (1.4) have, between the said first and second elements, at least one magnet element (1.4.2) and a conductor element (1.4.1), where the conductor element (1.4.1) is connected to the rotating first element (1.1) and the at least one magnet element (1.4.2) is connected to the fixed said second element (1.2), or conversely the at least one magnet element (1.4.2) is connected to the rotating first element (1.1) and the conductor element (1.4.1) is connected to the fixed second element (1.2).

The invention furthermore relates to the use of rotation dampers of this type in vibration absorbers, in particular for tall slim installations and buildings, preferably wind turbines.

The invention thus relates, in particular, to a vibration absorber arrangement suitable for damping vibrations which occur in operating wind turbines, similarly tall installations or buildings, or during erection thereof, comprising at least one swinging mass (7) at least one pendulum rod or pendulum cable (8), and an eddy current damping device, which is connected on the one hand to the pendulum mess, on the other hand to the structure of the installation or building to be damped, where the eddy current damping device has the following features:

(i) a supporting construction (4),
(ii) a transport device (2), which is connected to the supporting construction, can be moved to and fro in a linear direction, and is capable of converting the linear movement into a rotational movement,
(iii) a connecting element (3), which is on the one hand attached to the transport device (2) and on the other hand is connected to the swinging mass (7) or to the structure (9) to be damped, and a connecting element (6), which is connected on the one hand to the supporting construction (4) and on the other hand, if the swinging mass (7) is connected to the connecting element (3), to the to the structure (9) to be damped, or alternatively is connected to the swinging mass (7) if the structure (9) to be damped is connected to the connecting element (3), so that said linear movement of the transport device (2) takes place on relative movement of the mass (7) with respect to the structure (9) to be damped, and (iv) at least one eddy current damping arrangement (1), which comprises at least one first, preferably rotationally symmetrical element (1.1) which rotates in operation,
a second, preferably rotationally symmetrical element (1.2), which is fixed relative to the first element and is attached to the supporting construction (4), and
eddy current damping elements (1.4) arranged between these elements, where
  (a) the at least one first element (1.1) which rotates in operation is a conductor element (1.4.1) or has conductor elements (1.4.1), and the fixed element (1.2) is a magnet element (1.4.2) or has magnet elements (1.4.2.1), or conversely
  (b) the at least one element (1.1) which rotates in operation is a magnet element (1.4.2) or has magnet elements (1.4.2.1), and the fixed element (1.2) is a conductor element (1.4.1), and the two elements (1.1) (1.2) are arranged essentially parallel to one another with maintenance of an air gap, where the eddy current damping arrangement (1) is functionally connected to the transport device (2) in such a way that, in case of relative linear movement thereof, a corresponding relative rotational movement of the elements (1.1) (1.2) occurs, causing generation of an eddy current between these elements and a force which counters the movement of the mass (7) and thus the excitation vibration.

In an embodiment of the invention, the connecting element (3) is firmly connected to the transport device (2) by means of a clamping or attachment element (3.1).

In another embodiment of the invention, the connecting element (3) has two joints (3.2) opposite one another at the height of the transport device (2).

In a further embodiment of the invention, the transport device (2) comprises a running band or running belt (2.1) or is a toothed belt, where the latter is guided over at least two toothed transport rollers (2.2).

In a further embodiment of the invention, the transport device (2) comprises a toothed rack (2.4), a spindle or ball spindle (2.5), instead of or as well as a running band or running belt.

Preferably, the conductor element (1.4.1) is made of aluminium, copper or an alloy thereof, and the magnet element (1.4.2) comprises permanent magnets or electromagnets which are positioned on a support disc (1.4.2.1). In an embodiment of the eddy current damping arrangement (1.4), the field strength of the magnets and thus the damping force is controllable.

In another embodiment of the invention, the eddy current arrangement (1.4) is constructed from a first magnet disc (1.4.4), a conductor disc (1.4.6) opposite the latter, and a second magnet disc (1.4.5) on the other side of the conductor disc, where the discs are in each case separated from one another by an essentially constant air gap, where the second magnet disc (1.4.5) may also be in the form of a magnetic ring which is connected to the first magnet disc (1.4.4) via curved connecting elements.

In a further embodiment of the invention, the vibration absorber device also comprises devices for adaptation of the frequency of the vibration system through the use of corresponding spring elements.

Likewise, the absorbers according to the invention may also have devices for temperature compensation in the case of eddy current damper arrangements.

Of particular importance are also eddy current vibration absorber arrangements according to the invention in which the damping achieved increases with increasing excursion of the swinging mass (7) and thus of the transport device (2), and conversely decreases with decreasing excursion. The damping can thus be changed and controlled adaptively depending on the amplitude of the mass pendulum (7)(8), or the consequent excursion of the transport device (2). In order to achieve this, an adjustment device is proposed which moves a component that is able to change the gap between the conductor elements and the magnet elements depending on the swing travel.

Further embodiments of the invention are indicated and described in detail below.

The invention likewise relates to the use of a vibration absorber arrangement as described above and below for damping vibrations which arise during the erection or operation of a tall and slim building or tower (9) and industrial installations of corresponding design, particularly in wind turbines.

DESCRIPTION OF THE INVENTION AND EMBODIMENTS

The vibration absorber according to the invention comprises a conventional mass pendulum device, and at least one damping device (10) according to the invention.

The damping device (10) according to the invention in turn comprises a supporting construction (4), a transport device (2), the actual damping arrangement (1) and a connecting element (3) (FIG. 1)

A plurality of the damping devices (10) according to the invention, in particular two to six, can be built into the installation to be damped, for example a wind turbine (FIG. 8)

The transport device (2) is mounted on the supporting construction (4) or is a part thereof. The actual damping arrangement (1) is in turn attached to the transport device (2).

The damping arrangement (1) essentially comprises at least one rotating first element (1.1), which is moved relative to a fixed second element (1.2), with damping elements (1.3) being arranged between these elements.

These damping element (1.3) are preferably eddy current damping arrangements, or elements (1.4), but may in accordance with the invention also be others, such as, for example, frictional damping arrangements (1.5) or fluid damping arrangements (1.6), or also damping arrangements with conventional magnet elements (1.7), as are all known per se in the prior art. Examples thereof are electrical generators, which convert the loss work into electrical energy in order to convert this into heat in resistances, use it further directly or be able to store it for later further use, example in storage batteries.

In a first embodiment of the invention, the transport device (2), which is mounted on the supporting construction (4), is connected to the swinging mass (7) via a connecting element (3) (FIG. 1-3)

In a second embodiment of the invention, the transport device (2) may also be connected to the structure (9) to be damped, for example the tower wall of a wind turbine, via the connecting element (3). In this case, the swinging mass (7) is connected to the supporting construction (4) of the transport device (2) via a connecting element (6) (FIG. 15)

In both cases, the kinetic energy of the swinging mass (7) generates a linear to-and-fro movement of the transport device (2) acting in one direction, causing rotational movements of the said damping arrangement (1) to occur and forces to be generated which counter the swinging mass (7).

The connecting element (3) is in the simplest case an appropriately designed joint, so that transport device and mass are connected more or less directly.

In a preferred embodiment, the connecting element is an independent component which can be moved about an axis transverse to the linear movement of the transport device via one or two swivel joints (3.2), and has a further joint connection (3.3) to the swinging mass (7) or optionally to the structure (9) which is designed so that relative spatial movement is ensured. In a further embodiment, the joint connection (3.3) of the connecting element (3) is replaced by an elastic joint (15) which simultaneously allows yaw (rotation) and pitch movements.

Suitable transport devices (2) in accordance with the invention are all technical means which facilitate conversion of a linear movement into a rotational movement, such as, for example, running belt, running band, toothed belt, toothed rack, spindle ball spindle or thrust crank, as well as corresponding devices for transport, such as rollers, rails, etc.

A common feature of all these means is that, in accordance with the invention, they transmit their linear kinetic energy to a rotating element (1.1) of freely selectable radius connected to them. With increasing radius of the rotating element (1.1), however, a significantly greater speed of rotation can be achieved than given by the speed of the linear movement.

In a preferred embodiment of the invention, use is made of a running belt (e.g. flat belt, V belt) or running band, in particular a toothed belt (2.1), which is moved on transport rollers (2.2) or toothed wheels. In this case, at least one transport wheel also serves as drive wheel (2.2.1) for the said rotating element (1.1), which, in accordance with the invention, has a significantly greater radius than the drive wheel. In the simplest embodiment, the transport device thus consists of a toothed belt which is guided on two transport rollers (2.2) mounted opposite one another on the supporting construction and can thus be moved to and fro together with the connecting element (3)(3.1) attached to it, which is in turn connected via the said joint connection (3.3.1).

The toothed belt or running belt can of course also be guided over more than two transport rollers. In the case of a toothed belt, the transport rollers are preferably fitted with teeth which enable slip-free transport of the connecting element with the mass.

In all embodiments of the invention, the rotating element (1.1) is part of the damping arrangement (1) and is connected directly to the transport device (2). The rotating element can be, for example, a wheel, a disc or an internal gear wheel. In the case of an eddy current damper in accordance with the invention, which represents a preferred embodiment of the invention, the rotating element (1.1) is fitted with magnet elements (1.4.2) or conductor elements (1.4.1).

This type of damper will be explained in greater detail below.

The conductor elements are formed by a material which conducts electric current well, such as, for example, aluminium or copper or corresponding alloys. The conductor elements can be in the form of a plate, band, ring or individual parts which are arranged on a support plate, support band or support ring.

The magnet elements are formed by magnet rings or, for practical reasons, individual bar magnets which are arranged on a support plate, support wheel, support band or support ring. Adjacent magnet elements are preferably positioned in such a way that north and south poles are opposite one another. It is also possible to employ electromagnet elements, which have the advantage that the field strength is adjustable, and can even be switched off if desired.

In a first embodiment of the invention, the rotating element (1.1) is a conductor disc or plate, or support disc/plate for conductor elements, preferably made of aluminium. In the case of a support plate, the conductor elements may be mounted on the side surface.

However, it is also possible to mount the conductor element as a continuous band on the periphery of the rotating element (1.1) in the form of a disc or wheel—i.e. on the wheel crown thereof, where, in this case, the periphery of the wheel or disc, or of the rotating element (1.1), should be sufficiently broad.

In another embodiment, the rotating element (1.1) is support for a magnet arrangement comprising magnet elements (1.4.2), preferably in the form of a disc or wheel, or internal gear wheel, where the magnet elements are mounted on the disc or wheel surface.

However, it is likewise possible here to mount the magnet elements described on the periphery of the rotating element (1.1) in the form of a disc or wheels—i.e. on the wheel crown thereof.

The rotating element (1.1) therefore carries either the conductor function or the magnet function of the eddy current damping arrangement. In accordance with the invention, a second, but fixed element (1.2) is always arranged opposite it, with the two elements (1.1)(1.2) being separated from one another by an essentially constant small air gap of about 1-5 mm. The fixed element (1.2) is mounted here on the supporting construction (4) or is a part thereof. The space between the first and second elements formed in the region of the functional parts (magnet/conductor) by the air gap is completely friction-free, and thus differs, for example, from the vibration absorber of EP 2 616 072, which proposes its own sliding arrangement here between the parts of the eddy current arrangement moved relative to one another.

The element (1.1) stimulated to rotation by the linear movement of the transport device (2) is therefore moved relative to the fixed element (1.2) causing induction of an eddy current with a magnetic field, which counters the rotation and ultimately leads to damping of the swinging mass (7) and of the construction (9).

In an embodiment of the invention, the rotating first element (1.1) is therefore fitted with a conductor function, as described, and accordingly the fixed second element (1.2) is fitted with a magnet function.

Conversely, in another embodiment, the rotating first element (1.1) is provided with a magnet function and the fixed second element (12) with a conductor function.

In a further embodiment of the invention, magnet elements are mounted on the side surface of the disc or wheel (of the rotating or fixed element) in a certain radius to the point of rotation, and are arranged radially or tangentially. The magnet elements here may also be arranged in several rows with different radius. As stated, the radius determines the speed with which the magnet arrangement moves relative to the conductor element, and thus also the damping effect.

In another embodiment of the invention, magnet elements (1.4.2) are mounted on the periphery, or on the wheel crown of the rotating element (1.1), and the conductor element (1.4.1) is mounted on the fixed element (1.2), which is arranged here opposite rotating element (1.1) and surrounds the latter.

Conversely, the conductor element (1.4.1) may also be mounted on the periphery or wheel crown of the rotating element (1.1), or the rotating element may itself be in the form of a conductor element (e.g. an aluminium disc), while the magnet elements are arranged on the surrounding fixed element.

The magnet elements can in all cases be arranged radially or tangentially in relation to the rotating or fixed element. They can also be arranged in several rows above or below one another on the side surface of a support disc or support wheel. They can furthermore also be arranged along the periphery or on the periphery in different number or with different field strength, which enables, for a certain movement state of the mass (7), a greater or lesser damping effect to be achieved compared with the prior or subsequent movement state.

The eddy current damping effect can be enhanced through the use of ferromagnetic elements (1.4.3), for example an iron or steel disc, which can be brought into contact with the conductor element (1.4.1) on the side opposite the magnet elements.

In a particular embodiment of this invention, centrifugal force masses (1.4.11) are employed on a rotating element which have conductor elements (1.4.9) in the form of circle segments and can be brought, depending on the speed of rotation, into the functional vicinity of the opposite magnet elements (1.4.8), with a reduction or increase in the width of the air gap. This enables a modification or adaptation of the damping effect to the circumstances of the vibration system.

It is also possible to select the stop points of the connecting element (3), for example on the said toothed belt transport device, depending on the movement of the mass or pendulum, in such a way that the damping effect in the region of the reversal points of the pendulum is relatively great compared with the damping when the pendulum passes through the lowermost point with the greatest speed. In the case of a fully symmetrical arrangement and free running of the linear movement of the transport device, by contrast, the damping is greatest when the pendulum mass passes through the lowermost point, since the speed of the pendulum is greatest here.

Similar effects in relation to the reversal or shift of the damping effect can also be achieved if the device is not positioned horizontally, but instead vertically or at an angle between >0° and <90° to the horizontal. The damping can thus be adapted to the desired circumstances of the vibration system.

The rotating element (1.1) is preferably rotationally symmetrical in the form of a disc or wheel (with spokes) or an internal gear wheel. Depending on the size of the installation to be damped or of the mass pendulum, it has a diameter between 300 and 800 mm, in particular of about 500 mm. The fixed element (1.2) has correspondingly similar dimensions and is likewise preferably rotationally symmetrical.

The supporting construction (4) with the transport device (2) accordingly has a length between 600 mm and 1500 mm, preferably 800 to 1000 mm. However, the stated sizes are not limiting in accordance with the invention and can adopt both greater and also smaller values, corresponding to the vibration systems to be damped.

The damper device (10) according to the invention may also provide a plurality of damping arrangements (1) on the transport device (2), i.e. also a plurality, in particular 2-4, rotating elements (1.1) and accordingly also a plurality of fixed elements (1.2).

In the case of a transport device with running belt or toothed belt (2.1) which is guided on, for example two rollers, it is not only possible for one roller to function as drive wheel (2.2.1) for a rotating element (1.1) via the shaft (5), but also for two or more rollers (2.2) of the transport device to be connected to one rotating element (1.1) each via one shaft (5) in each case. This not only enables greater damping effects to be achieved, but a symmetrical load distribution is also achieved, which has a protecting effect on the wear of the transport device and thus of the entire vibration absorber.

It is also possible for a shaft (5) driven by a drive wheel (2.2.1) to have two, three or four rotating elements (1.1) on both ends of the shaft (5).

In the case of a single belt or band device (2.1)(2.2) on the transport device, up to four damping arrangements (1) can thus be used.

In a further embodiment of the invention, a gearbox with translation can be installed between drive wheel (2.1.1) or a component with a similar function and the rotating element (1.1), which are both connected via the shaft (5), which enables more than one rotation of the rotating element (1.1) to be effected per rotation of the drive wheel. An increase in the speed of rotation of the rotating element (1.1) can thus furthermore be provided for, and thus an increase in the damping effect caused by eddy current.

In the case of the use of a toothed belt or running band/belt with transport rollers, the guiding of the connecting element (3) or its attachment (3.1) to the belt can take place in a substantially load-free manner. In the simplest embodiment of the invention, a supporting or guiding element is therefore not necessarily needed. However, it is advantageous and frequently necessary to provide such a supporting and guiding element in the form of a rolling or sliding device (2.3), at least in the region of the attachment (3.1) of the connecting element (3). For example, a carriage (2.3.1), on which the belt can support itself and which can be moved on running rails (2.3.2), or a roller running band (2.3.3) can be employed, or alternatively also a sliding device (2.3.4).

As described above, the vibration absorber arrangements according to the invention preferably have, as actual damping element, an eddy current device, which is accommodated between the rotating first element (1.1) and the fixed second element (1.2).

However, the invention likewise relates to vibration absorbers which work with another type of damping, but are otherwise constructed in exactly the same way. Thus, friction elements of a wide variety of types, including solid materials or liquids, can serve as damping medium. Corresponding materials and devices are known in the prior art. The friction element used can be, e.g., rotating brake linings on the rotating element (1.1), which are pressed, as a function of the rotation, against the likewise rotationally symmetrical, fixed element (1.2) designed as brake drum, for example by restorable centrifugal force masses.

It is furthermore possible to design the rotation disc as disc brake. In addition, one or more additional brake discs may be installed. Load peaks can be absorbed by means of this supplementary brake. The rotating conductor disc can likewise simultaneously be used as disc brake, which is used as overload brake.

Fluids of changeable viscosity can also be employed as friction elements (fluid dampers). Finally, conventional magnetic dampers can also be used in vibration absorbers.

DETAILED DESCRIPTION OF THE PREFERRED EMBODIMENTS

Figure 1:
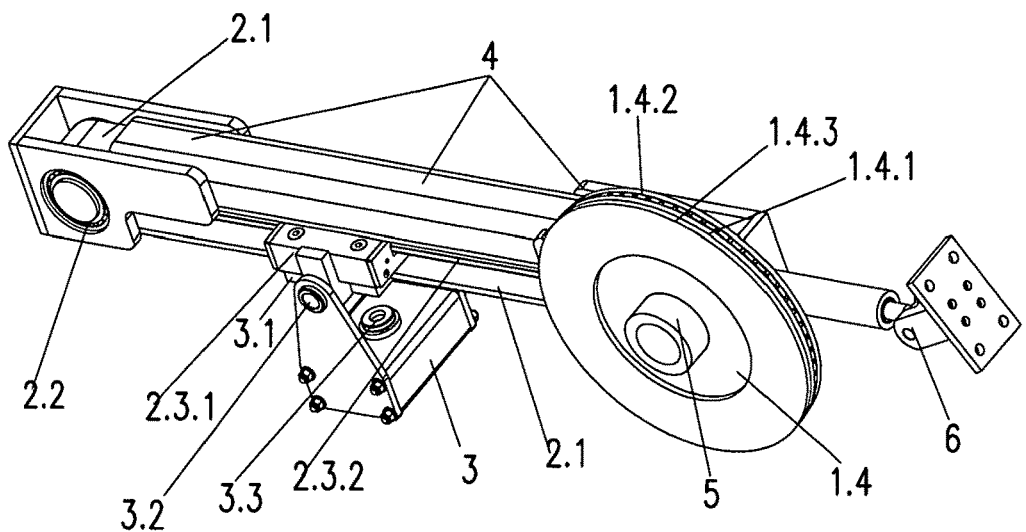
FIG. 1 shows a perspective view of a damper device in accordance with the invention which can be used in a vibration absorber with pendulum and pendulum mass.

The embodiments depicted in detail in the drawings are outlined below.

FIG. 1 shows a perspective view of a damper device (10) in accordance with the invention which can be used in a vibration absorber with pendulum and pendulum mass. A transport device (2) is mounted on a supporting construction (4). The supporting construction has a connecting element with joint (6) in order to connect the supporting construction to the vibrating structure (9) to be damped, or vice versa. The transport device (2) consists of two rollers on bearings at the left hand and right-hand ends of the device. The two rollers are connected to one another via a running band/running belt (2.1). The one (right-hand) roller is mounted on a shaft (5) and drives the latter during its rolling movement and thus also the actual disc-shaped damping arrangement (1), which has been pushed onto the shaft and in the specific case has elements of an eddy current damping arrangement (0.4). In detail, these are the following: a conductor disc (1.4.1), which is able to rotate, and corresponds to the rotating first element (1.1), a magnet disc (1.4.2), which is generally a support disc, on which permanent or electromagnets are mounted on one or both sides, and which is separated from the conductor disc in a noncontact manner by a narrow air gap (not shown), and in a preferred embodiment a ferromagnetic disc (1.4.3), which is mounted on the other side of the conductor disc.

Conductor disc (1.4.1) and ferromagnetic disc (1.4.3) rotate on the shaft (5), while all other elements of the damping arrangement are fixed and are ultimately connected to the supporting construction (4).

The conductor disc (1.4.1) on the shaft (5) is driven by the roller (2.2.1) and the running band (2.1). The latter is connected to the connecting element (3) via the attachment or fixing element (3.1). The two ends of the running band or belt are usually joined together at this point, unless a continuous belt is employed. The connecting element (3) is in the form of a swing or chair, with opposite pivot joints (3.2) with an imaginary axis at the height of the belt/band. A further joint (3.3) is provided centrally on the base of the swing, that can serve all directions.

The swinging mass (7) of the pendulum (8) or alternatively the structure (9) to be damped can be attached directly or cardanically to this ball joint (not depicted).

In general, the connecting point (3) can be attached both to the pendulum mass (7) and to the construction (9) to be calmed. If (3) is attached to (7), the structure (9 is attached to the connecting point (6). If, by contrast, the structure (6) is attached to the connecting point (3), the mass (7) is attached to the connecting point (6).

A rolling device (2.3) is provided above the fixing element (3:1). This rolling device comprises a carriage (2.3.1), on which the belt/band (2.1) can rest. Its rollers move on a running rail (2.3.2) installed above. The carriage, which usually runs on rails, may also be replaced by a plurality of supporting rollers or alternatively by a sliding device, or a conveyor belt. In the case of linear to-and-fro movement of the connecting element (caused by the swinging mass of the pendulum), the running belt and thus the drive wheel (2.2.1) is therefore moved and thus so is the rotating conductor element (1.4.1), effecting damping in the arrangement (1.4).

Figure 2:
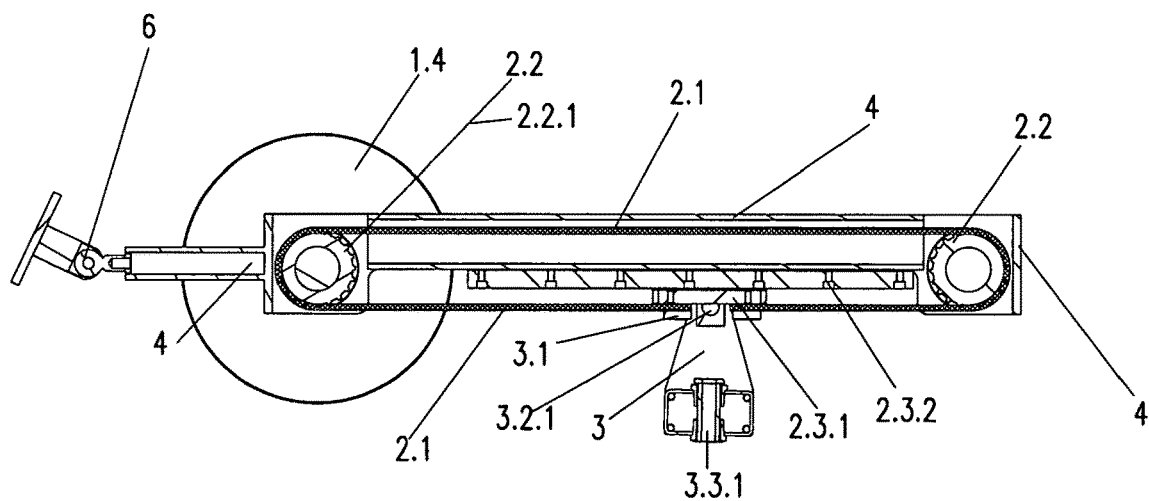
FIG. 2 shows a side view of the damper device according to the invention from FIG. 1.

FIG. 2: shows a side view of the damper device according to the invention from FIG. 1. The running band here is a toothed belt (2.1), the rollers (2.2)(2.2.1) are toothed wheels or wheels with a toothed periphery.

Figure 3:
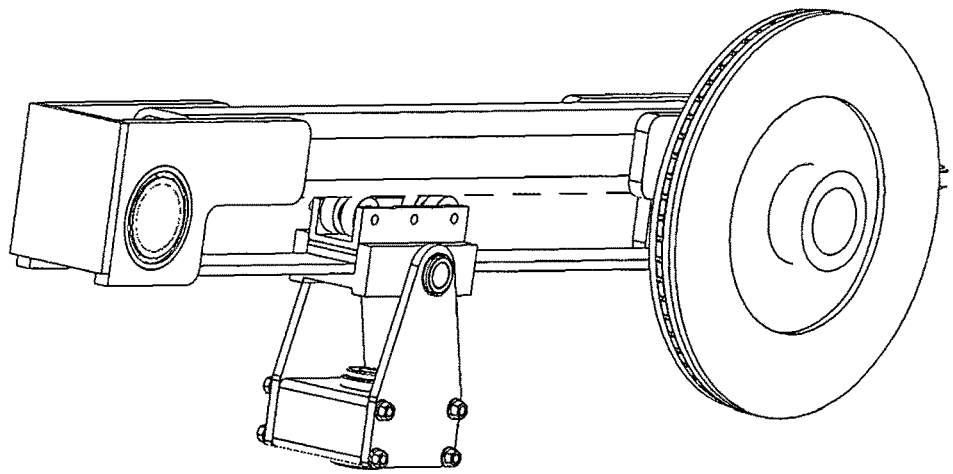
FIG. 3 shows a perspective view of the device according to the invention shown in FIG. 1.

FIG. 3: shows a further perspective view of the device according to the invention shown in FIG. 1

Figure 4:
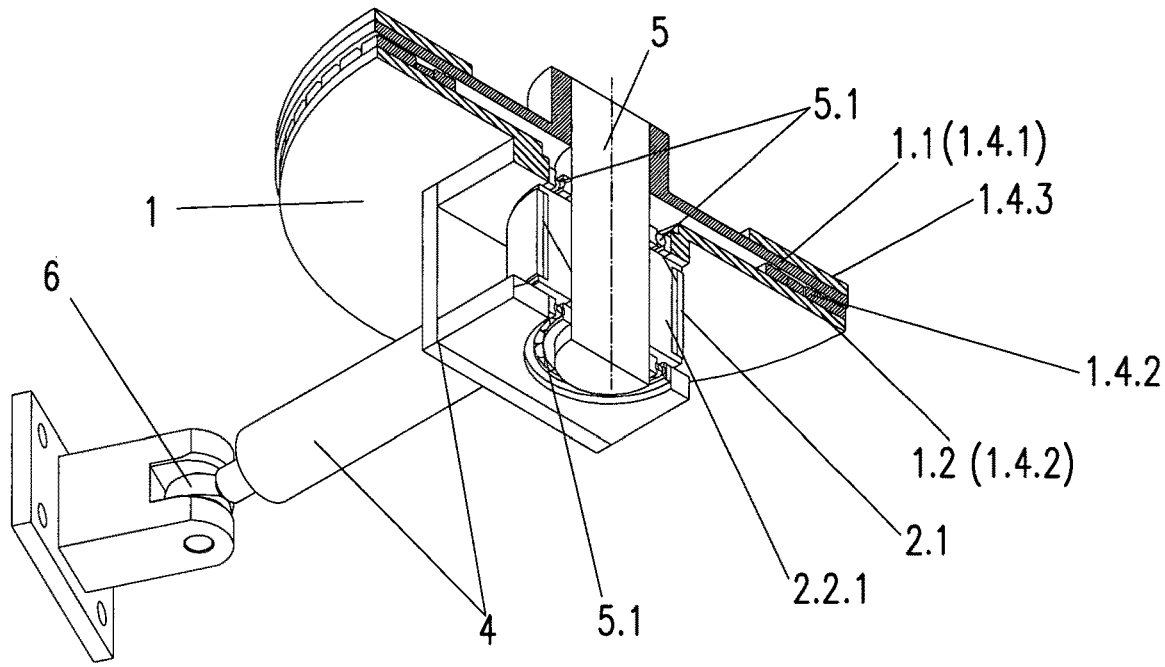
FIG. 4 shows a perspective section through the damper arrangement of an eddy current damper according to the invention.

FIG. 4: shows a perspective section through the damper arrangement (1)(1.4) of an eddy current damper according to the invention. The rotating element (1.1) is in turn a conductor plate (1.4.1), which is connected to the shaft (5). The shaft (5) is mounted correspondingly (5.1). The fixed element (1.2) is a support plate (1.4.2) for magnet elements (1.4.2.1). An air gap can be seen between the two plate elements. The conductor disc is set in rotation by the drive roller (2.2.1), which is driven by the movement of the belt (2.1). The conductor disc is in addition in contact with a ring-shaped ferromagnetic element (1.4.3), which is mounted on the outside of the conductor disc.

Figure 5:
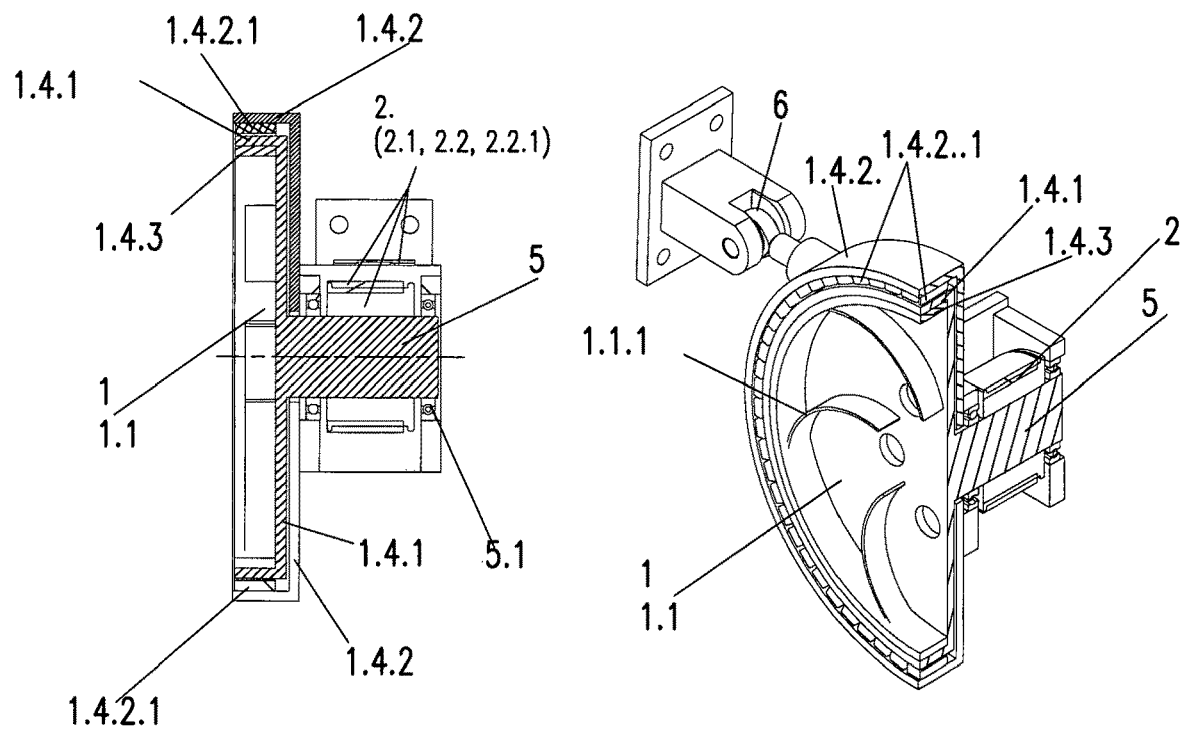
FIG. 5 shows an eddy current damper device in which the conductor and magnet elements are mounted on the periphery or over the periphery of a wheel or disc.

FIG. 5: shows an eddy current damper device in which the conductor and magnet elements are mounted on the periphery or over the periphery of a wheel or disc. The wheel/disc here takes on the function of the rotating element (1.1) and in addition has ventilation or cooling elements (here as blade wheel) (1.1.1). An aluminium band as conductor element (1.4.1) is attached to the periphery of the wheel here. An iron or steel band is also introduced as damping enhancer between the conductor element and the wheel crown. A fixed disk, which is attached to the transport device or to the supporting device, serves as support disc (1.4.2) for the magnets (1.4.2.1), with the magnets likewise being mounted on the periphery of this disc. The fixed disk with the magnets has a correspondingly greater diameter than the rotating disc with the conductor element, and is arranged in such a way that its periphery is above the periphery of the conductor element. The magnet element are then positioned on the inside of the outer periphery, while the conductor element with the ferromagnetic element is arranged on the outside of the inner periphery. However, a converse arrangement in which the fixed parts are arranged on the inside and the rotating conductor element is on the outside is likewise possible.

Figure 6:
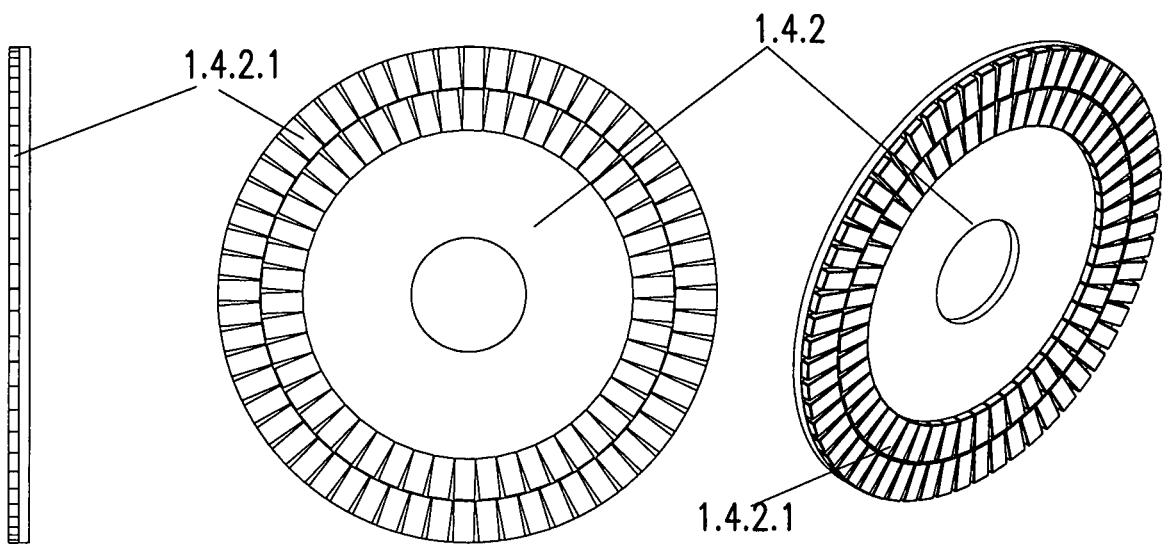
FIGS. 6*a* and 6*b* show possible arrangements of the magnet elements on the support element.
Figure 6:
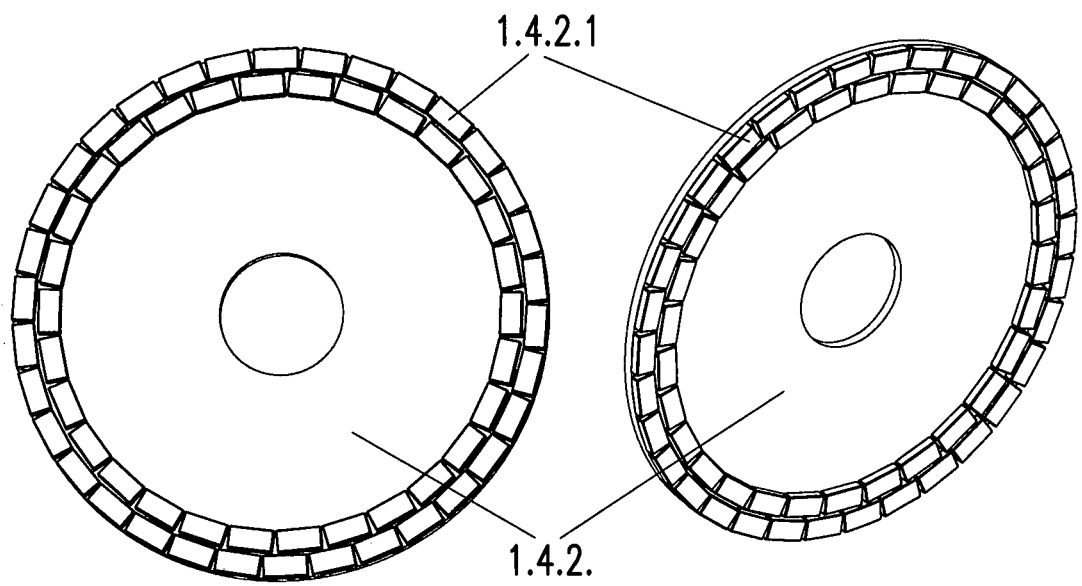

FIG. 6: shows possible arrangements of the magnet elements 1.4.2.1 on the support element 1.4.2. (a) two rows of magnet elements are arranged here on the outer edge of the support disc in radial alignment with respect to the poles, where north pole and south pole preferably lie opposite one another. (b) two rows of magnet elements are arranged here with tangential alignment in each case (likewise preferably north-south alignment)

Figure 7:
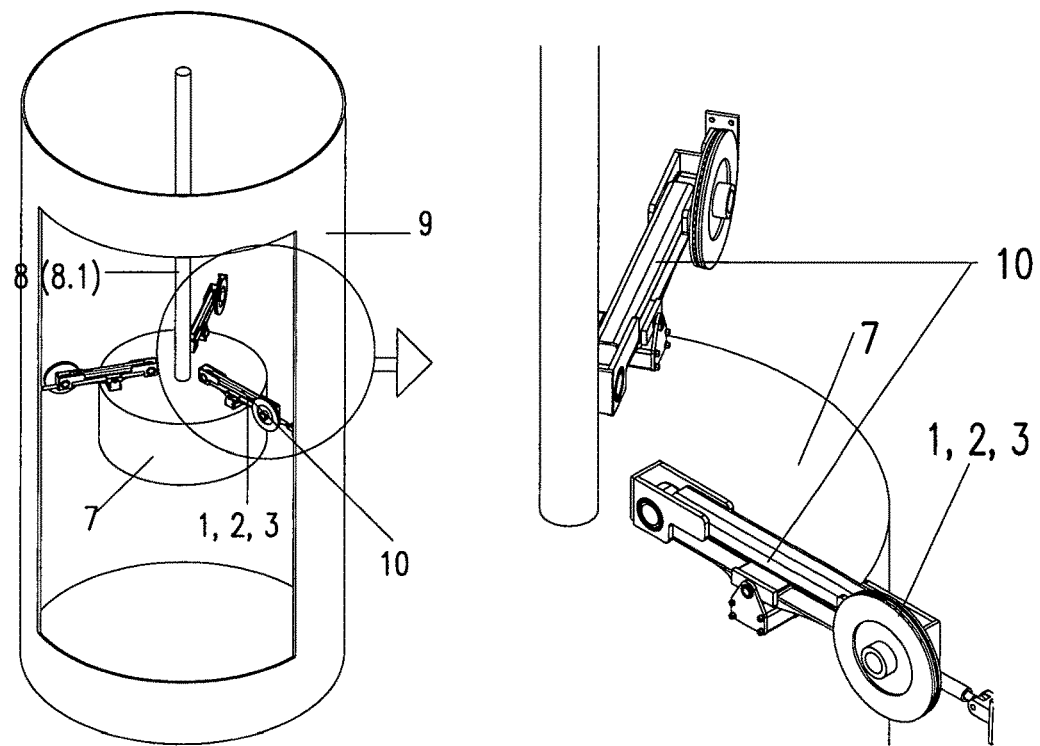
FIG. 7 shows a vibration absorber according to the invention with a pendulum and a mass in a tower, where the mass is connected to three damper devices, via the connecting element, or joint connection thereof, in order to cover all planes of swing of the pendulum as optimally as possible.

FIG. 7: shows a vibration absorber according to the invention with pendulum (8) and mass (7) in a tower (9), where the mass is connected to three damper devices (10), as described above, via the connecting element, or joint connection (3.2) thereof, in order to cover all planes of swing of the pendulum as optimally as possible. The damper devices are furthermore connected to the tower structure (9) via joint connections (6).

Figure 8:
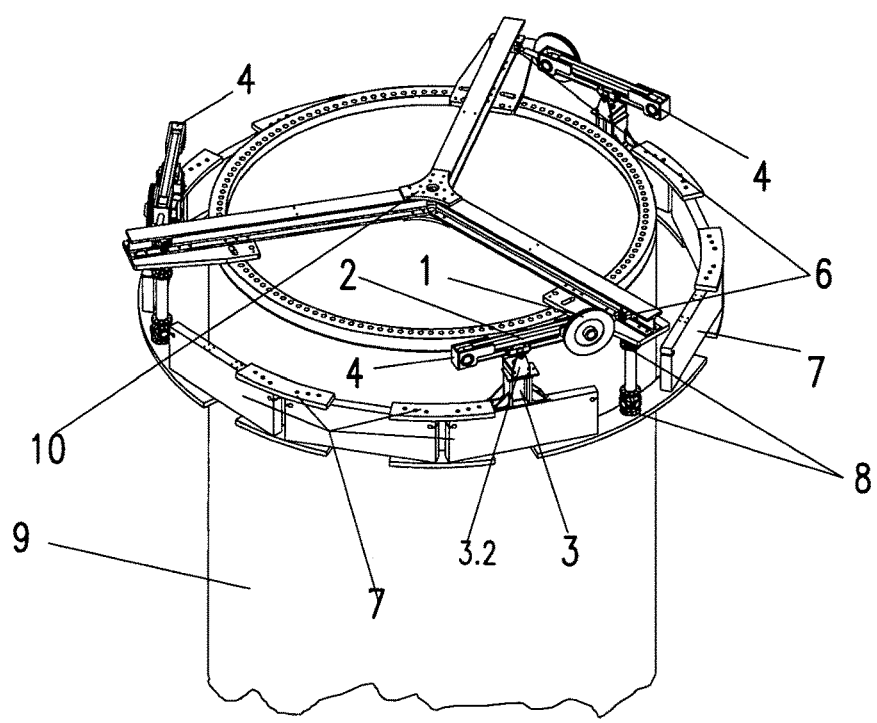
FIG. 8 shows an erection absorber which is fitted with the damping devices according to the invention.

FIG. 8: shows an erection absorber which is fitted with the damping devices (10) according to the invention. The erection absorber consists of a support ring, which is placed in a matching manner on the respective tower segment. The support ring has three arms, which have pendular suspensions (8) on which the swinging masses (7) hang. In this embodiment, the swinging masses (7) are arranged distributed around the tower segment. A damping device (10), as described, is attached to each of the three arms via a joint connection (6). The damping devices are in turn connected to the mass elements (7) via the joint connections (3.3).

Figure 9:
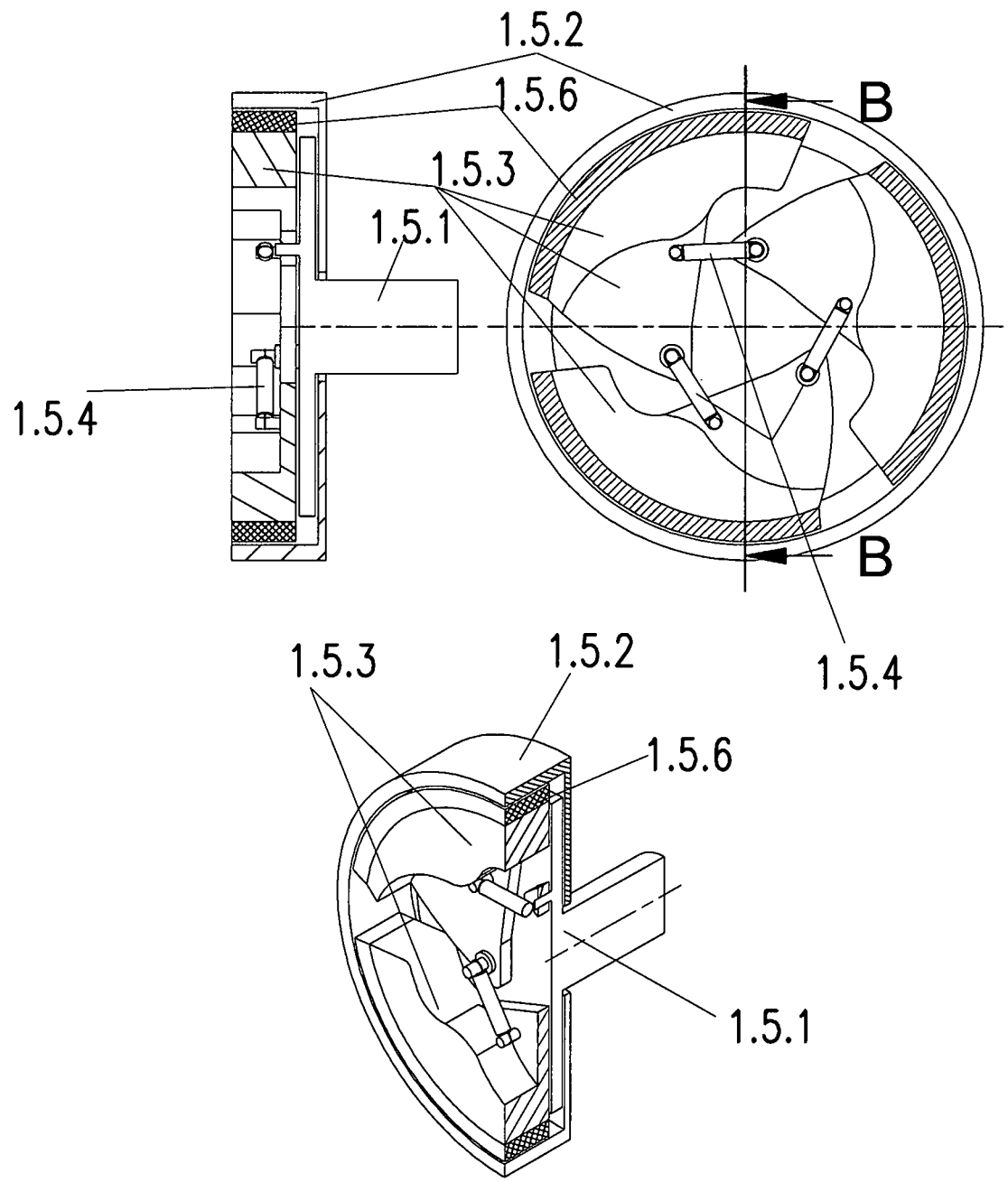
FIG. 9 shows a frictional damper according to the invention.

FIG. 9: shows a frictional damper according to the invention. Three centrifugal force masses (1.5.3) with restoration springs and joints (1.5.4) are mounted on a rotating disc (1.5.1) on a shaft. The centrifugal force masses have circular segments, which are arranged in such a way that they give rise to a disc with short interruptions. The circle segments are provided with a brake lining or friction lining on their outer edge. The rotating disc (1.5.1) with the centrifugal force masses arranged in this way moves relative to a fixed disk (1.5.2) configured as brake drum. At relatively high speeds of rotation, the brake lining segments are thus pressed against the brake drum, and the rotation is thus inhibited.

Figure 10:
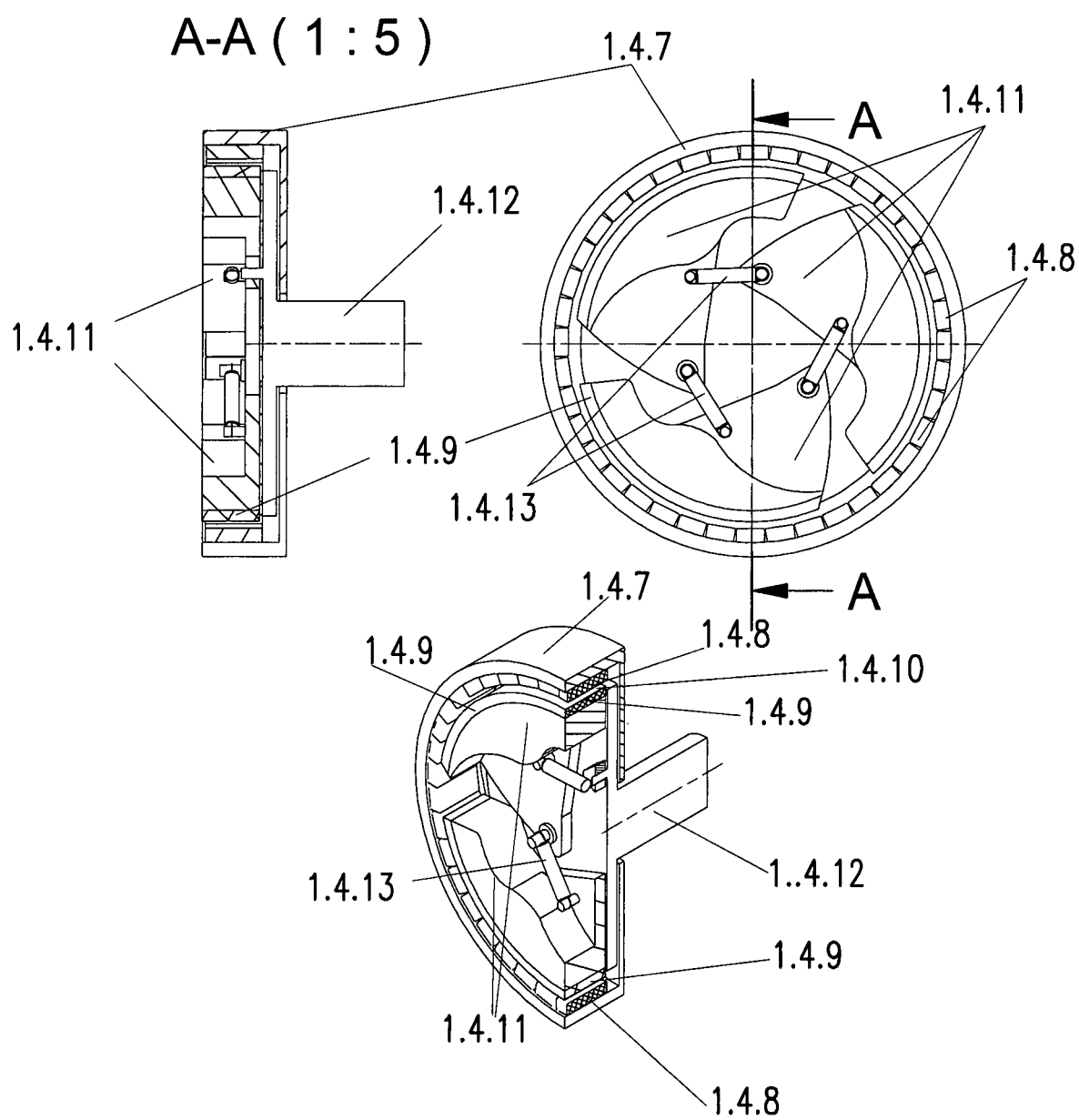
FIG. 10 shows a centrifugal force/eddy current damper according to the invention.

FIG. 10 shows a centrifugal force/eddy current damper according to the invention. It is in principle a combination of the embodiments of FIG. 5 and FIG. 9. Starting from FIG. 10, conductor elements (1.4.9) replace the brake lining segments (1.5.8). A ring with magnet elements (1.4.8) replaces the brake drum (1.5.2), where the magnet ring is part of the fixed element (1.2) (FIG. 6). Due to the centrifugal force masses (1.4.11), the circular segments of the conductor elements can thus be moved outward or inward depending on the speed of rotation, enabling the width of the air gap between the conductor elements and the magnet elements to be varied and thus also the damping effect.

Figure 11:
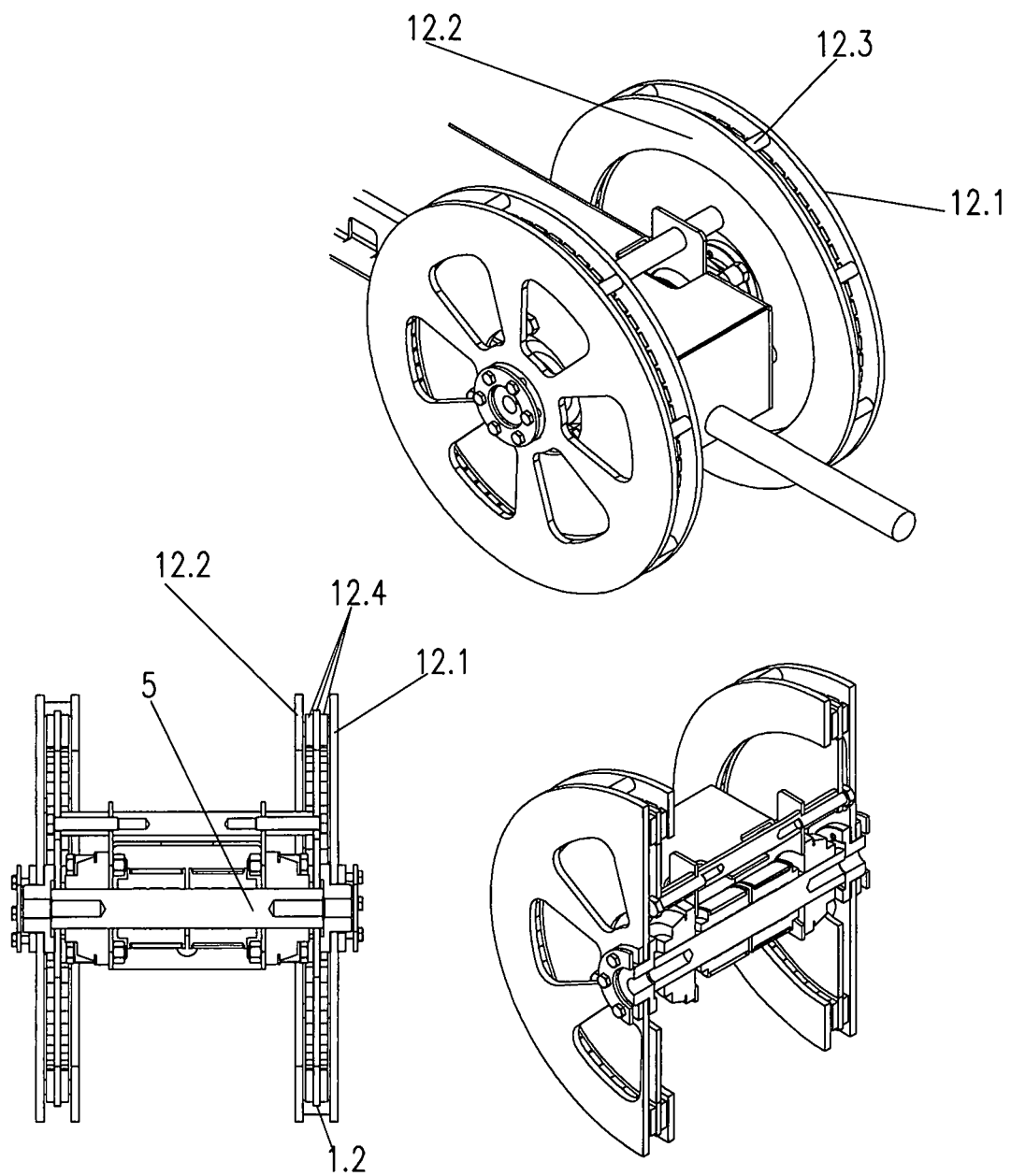
FIG. 11 shows a damper device having two damper arrangements lying opposite one another comprising eddy current damping elements, which are attached to the same transport roller.

FIG. 11: shows a damper device having two damper arrangements (1) lying opposite one another comprising eddy current damping elements (1.4), which are attached to the same transport roller (2.2). In contrast to the embodiment from FIG. 1, each of these damping arrangements (1) comprises an eddy current tandem disc, consisting of an outer conductor disc (12.1, corresponding to 1.4.6), an inner conductor disc (12.2) and a disc (12.4) arranged in between which is fitted with magnets on both sides. The outer and inner conductor discs are connected to one another via connecting elements ('12.3).

In a modified embodiment of the invention, the central disc is not fitted with magnets on both sides, but instead has openings into which the magnets are set, so that they are effective towards both sides. The number of magnets can thus be halved.

Figure 12:
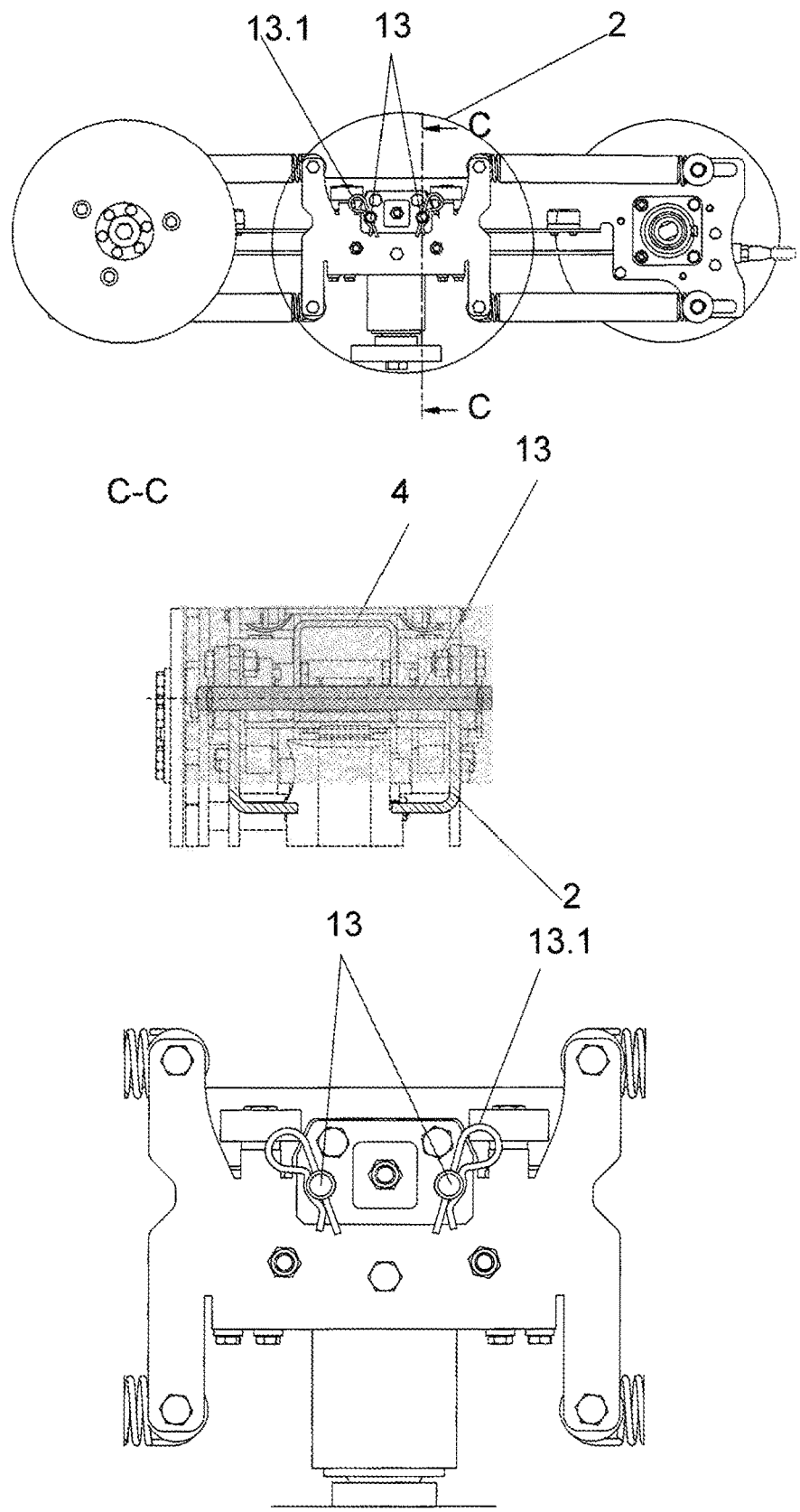
FIG. 12 shows various perspectives of a damper according to the invention which includes a locking device for the movable transport device.

FIG. 12: shows various perspectives of a damper according to the invention which includes a locking device for the movable transport device (2).

For maintenance purposes, the absorbers must be fixed. This usually takes place through additional attachment elements by means of which the absorber mass is bolted to the construction to be calmed. The locking described here enables the supporting construction (4) to be firmly connected to the transport device (2).

This takes place by means of a bolt (13), which is inserted into a hole passing through components (2) and (4) and secured. The running belt or running band is not loaded by this transport retaining device, giving a failsafe connection which ensures a safe working environment, even in the case of relatively high loads.

Figure 13:
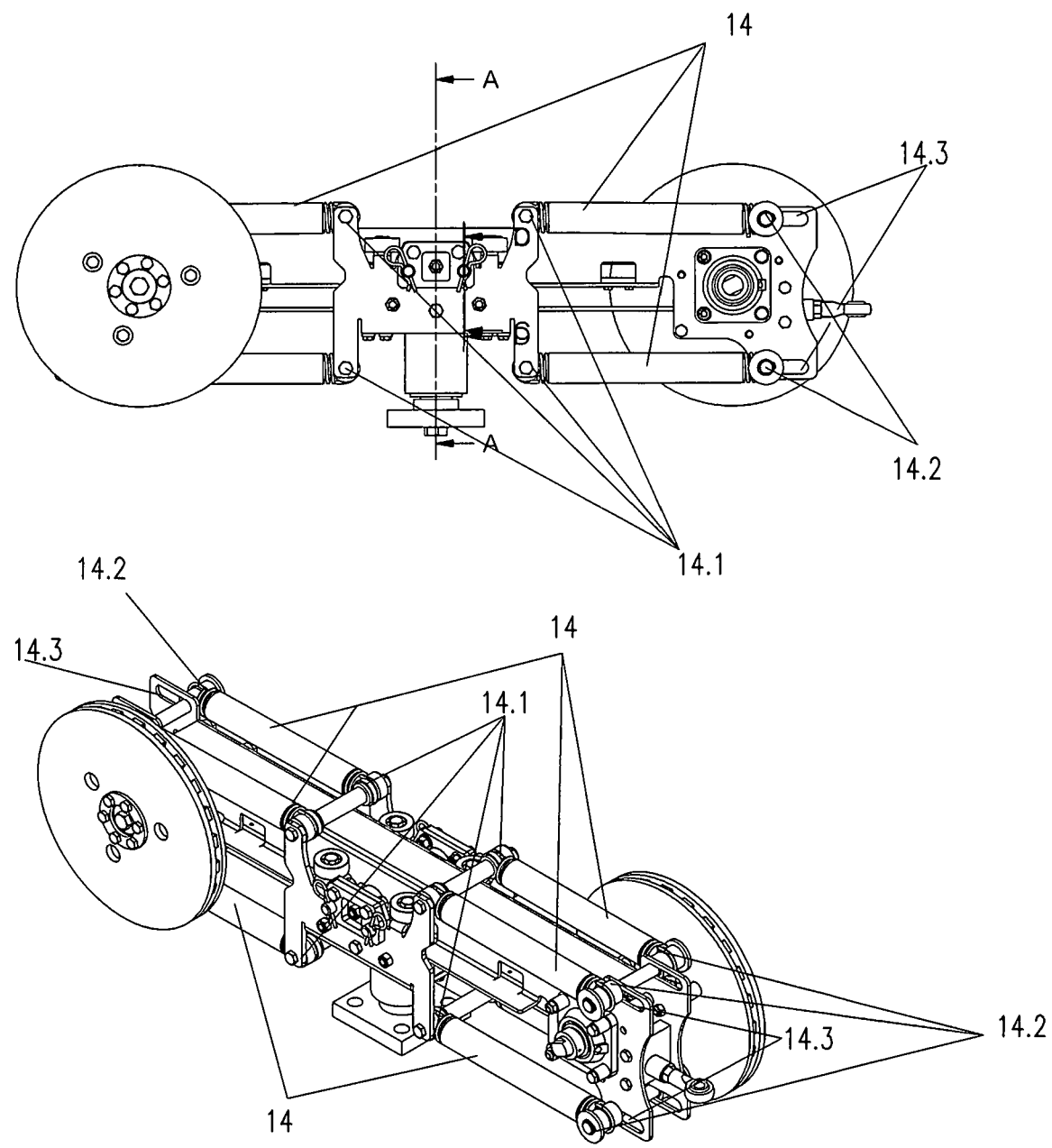
FIG. 13 shows various perspectives of a vibration absorber arrangement according to the invention which has devices with which the frequency of the absorber or vibration system can adapted.

FIG. 13: shows various perspectives of a vibration absorber arrangement according to the invention which has devices with which the frequency of the absorber or vibration system can adapted. This is necessary in the case of a wind turbine, for example, in order to even out any tolerances due to different substructure, different foundations, different tower stiffnesses, and different masses. Even at high frequencies, for example in connection with the second natural frequency of the tower in the region of about one hertz, pendulum rods with lengths of less than 200 mm are necessary. Geometrically, this can only be achieved with great difficulty or not at all. In particular, it is necessary for the pendulum rods to be at least as large as the requisite swing amplitude, which means that for this reason alone the rods must be longer than the length necessary for the frequency. This problem can be solved in accordance with the invention with the use of one or more supplementary springs (14). Supplementary springs require additional connection points (intersections) between swinging mass and mass to be calmed. The spring elements (14) are mounted between the transport device (2) and the fixed element (1.2) of the damping arrangement (1), causing these to be tensioned against one another. They are advantageously tensioned here in such a way that the relieved spring does not become loose at full amplitude.

Long dynamic spring paths are thus required. In the case of rare large amplitudes, it is therefore provided that the relief spring (14) may become loose. In order that the relieved spring is not pinched (bent, compressed) in the case of an even longer travel, a spring attachment (14) is provided which is designed in such a way that it can divert into an oblong hole, (14.3).

For precise frequency setting, it is possible to install more or fewer springs. Furthermore, springs of different stiffness can be employed.

FIG. 13 shows the design with 2×4 hidden springs. The springs shown are standard steel tension springs, preferably made from stainless steel.

Figure 14:
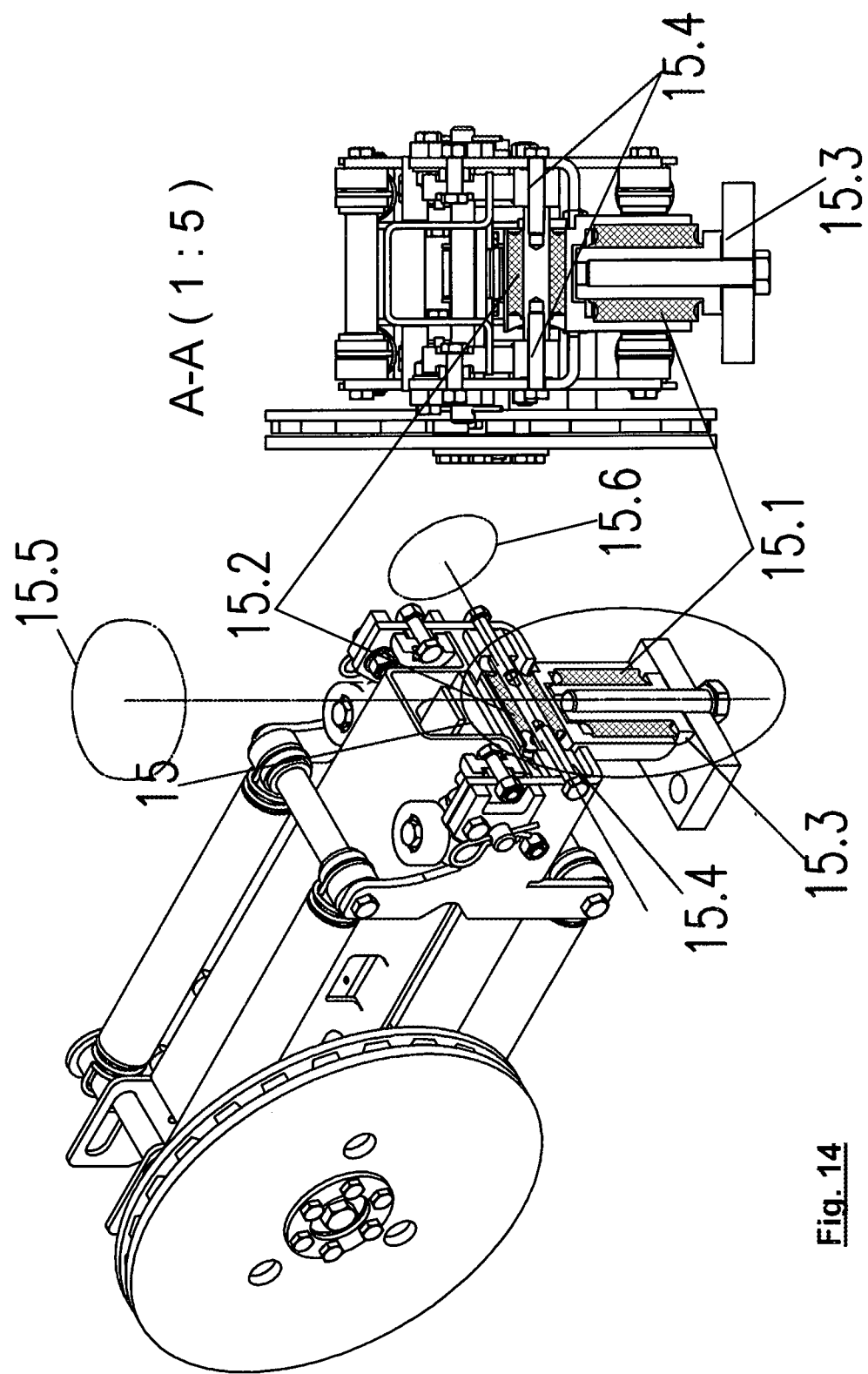
FIG. 14 shows various perspectives of a vibration absorber arrangement according to the invention which has an elastomer joint in the region of the connecting element in order to be able to achieve a yaw (rotation) and pitch movement of the damping unit.

FIG. 14: shows various perspectives of a vibration absorber arrangement according to the invention which has an elastomer joint in the region of the connecting element (3) in order to be able to achieve a yaw (rotation) and pitch movement of the damping unit (1).

For such requirements, sliding bearings or roller bearings have generally been used to date. Sliding bearings are subject to a certain wear, which leads to chattering of the joints, and roller bearings usually have to be serviced (lubricated).

The bearing (15) shown here consists of two constructionally integrated elastomer bushings, which are intended for rotational (yaw) and pitch movements. Element (15.1) allows the yaw movement (15.5) of the vibration absorber device according to the invention, element (50.2) is responsible for the pitch movement (15.6).

The drawing shows single-layered bushings in each case. For greater forces and larger angles, multilayered, (preferably two elastomer layers) are necessary. Owing to the elasticity of such bushings in all directions, 15.1 also takes on a small proportion of the pitch movement 15.6. At the same time, 15.2 also takes on a small proportion of the yaw movement 15.5.

Figure 15:
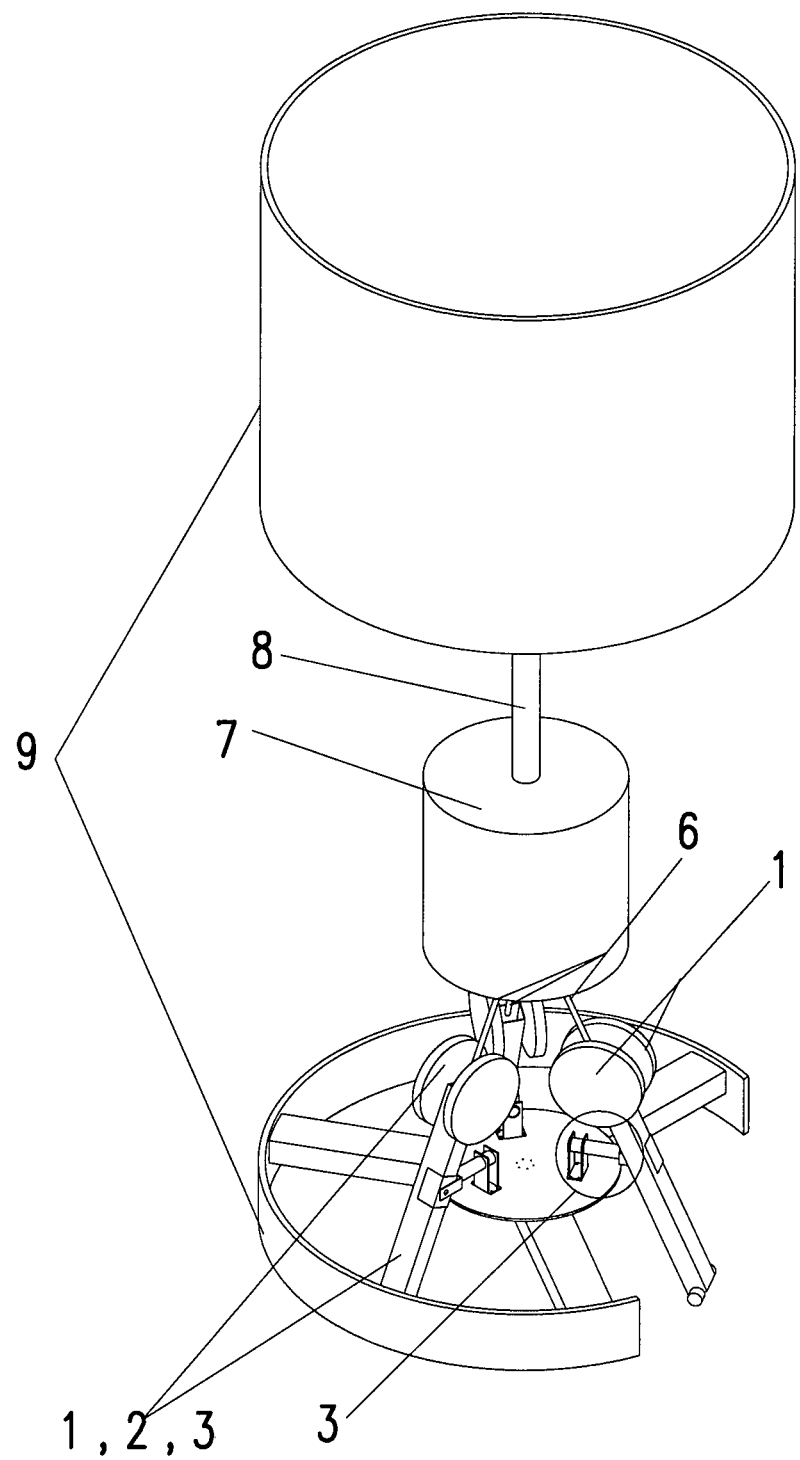
FIG. 15 shows a vibration absorber according to the invention which has an upright or non-horizontal damper device inside a tower of a wind turbine.

FIG. 15: shows a vibration absorber according to the invention which has an upright or non-horizontal damper device (10) inside a tower of a wind turbine. An advantage of a damper device of this type which is upright or arranged at an angle between 0 and 90° (relative to the horizontal plane of the tower) in the tower is that the damping is low when the pendulum passes through zero, whereas strong damping is generated at large amplitudes. In addition, this enables space to be saved. The disadvantage of the small amplitudes or small movements on passage through zero can be compensated by the use of larger damping elements 1 having larger discs and possibly more magnets in the case of eddy current damping.

Figure 16:
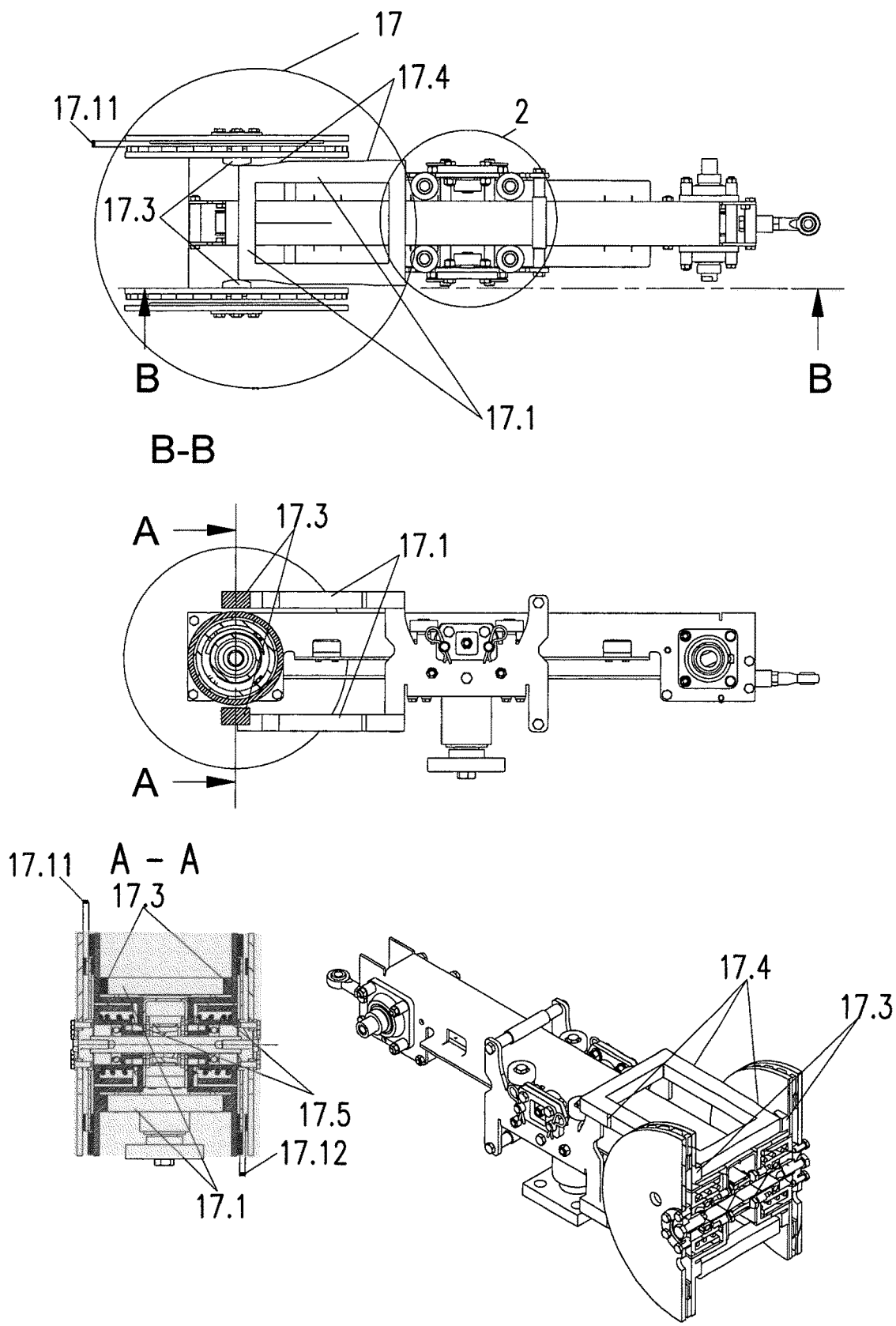
FIG. 16 shows a vibration damper according to the invention having an eddy current damping arrangement, in which the damping achieved becomes greater with increasing excursion of the swinging mass and thus of the transport device, and conversely becomes smaller with decreasing excursion.
Figure 16:
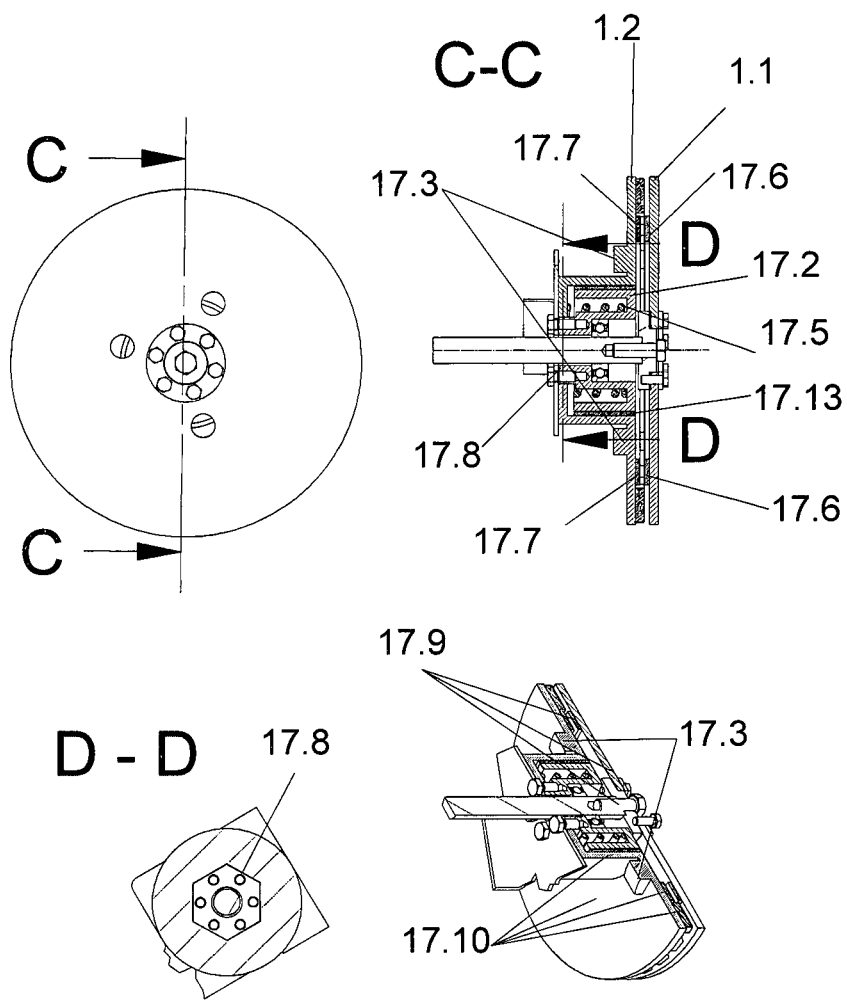

FIG. 16: shows a vibration damper according to the invention having an eddy current damping arrangement (1.4), in which the damping achieved becomes greater with increasing excursion of the swinging mass (7) and thus of the transport device (2), and conversely becomes smaller with decreasing excursion. To this end, the vibration absorber is provided with an adjustment device (17), which increases or reduces the air gap between the conductor plate and the magnet disc depending on the direction of the movement.

The adjustment device (17) thus enables the damping to be reduced and increased at any desired travel-dependent points of the transport device (2).

In principle, the system is constructed in such a way that the air gap between magnets and conductor disc can be changed depending on the swing distance. The air gap between magnets and conductor disc is varied here between 15 mm and 1 mm. The damping constant can thus be regulated by a factor of about 10. In particular, the air gap is regulated between 10 mm and 2 mm, resulting in a change in the damping constant by a factor of about five. The adjustment device (17)(17.1) is firmly connected to the transport device (2). This moves against adjustment cams (17.3) with increasing amplitude and thereby moves the fixed second element (1.2) with the magnets (1.4.2) of the damping arrangement (1) more or less close to the conductor disc (1.4.1). The pre-specified adjusted curves on the adjustment device (17.4) specify the desired separation as a function of distance. In the case of an even smaller air gap, it is possible additionally to install a brake disc (17.6)(17.7), which can again increase the damping extremely. The separation of the brake disc between rotating part and revolving part is selected here so that, in the case of contact with the brake disc, the magnets still remain free, which ensures that the air gap between conductor plate and magnet plate is still greater than zero.

In general, the adjustment curves on the adjustment device (17.4) are designed in such a way that the damping increases with increasing amplitude, or with increasing excursion of the swinging mass (7). Towards the end of the swing travel, the disc brake (17.6) and (17.7) can become involved. However, it is also possible to achieve great damping and, if necessary, additional braking, which is reduced again at increasing amplitude, through a different design of the adjusted curves (17.4) in any desired position. All prerequisites for the design of adaptive damping are thus provided.

This system preferably serves two rotation discs simultaneously. This has the advantage that the transverse forces arising due to the adjustment device are compensated when the adjustment cams (17) are pressed in. If only one damping arrangement (1) is performed, stable mounting of the transport device (2) is necessary. The recovery spring element (17.5) is used to counter the force introduced by the adjustment cams (17.3). The recovery spring element exerts a force which acts counter to the force acting on the cams. The "non-rotating and axially movable region (17.10) is permanently pressed against the supporting construction (4) by means of this spring. On engagement of the cams, (17.10) is pushed in the direction of the conductor disc. In order that (17.10) does not twist with the conductor disc, rotation inhibition (17.10) is provided. This can be, for example, a hexagonal connection between the elements (17.8) and the spring retention element (17.2). The spring retention element is firmly connected to the supporting construction (4). Equally, an axially movable connection can also be used between supporting construction (4) and (17.10).

The adjustment via the cams (17.3) takes place via friction.

In a further embodiment of the invention, rollers are used instead of the cams. Heavy-duty roller bearings, for example, in accordance with the prior art are suitable here.

Figure 17:
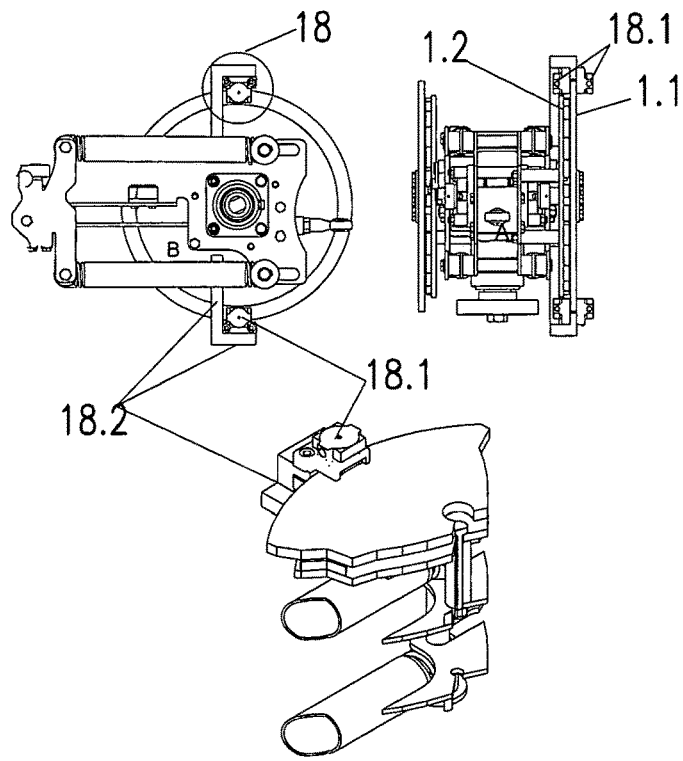
FIG. 17 shows the use of an additional disc brake, where the brake caliper engages with the brake caliper fixing on the outside diameter of the the rotating conductor disc.

FIG. 17 shows the use of an additional disc brake, where the brake caliper (18.1) engages with the brake caliper fixing (18.2) on the outside diameter of the the rotating conductor disc. The conductor disc is preferably made of a stronger material, such as, for example steel, in the outer diameter with which the brake caliper engages. If the brake is only used for rare extreme loads, the material of the conductor disc, aluminium or copper, could also be used, which would mean a simpler embodiment.

Figure 18:
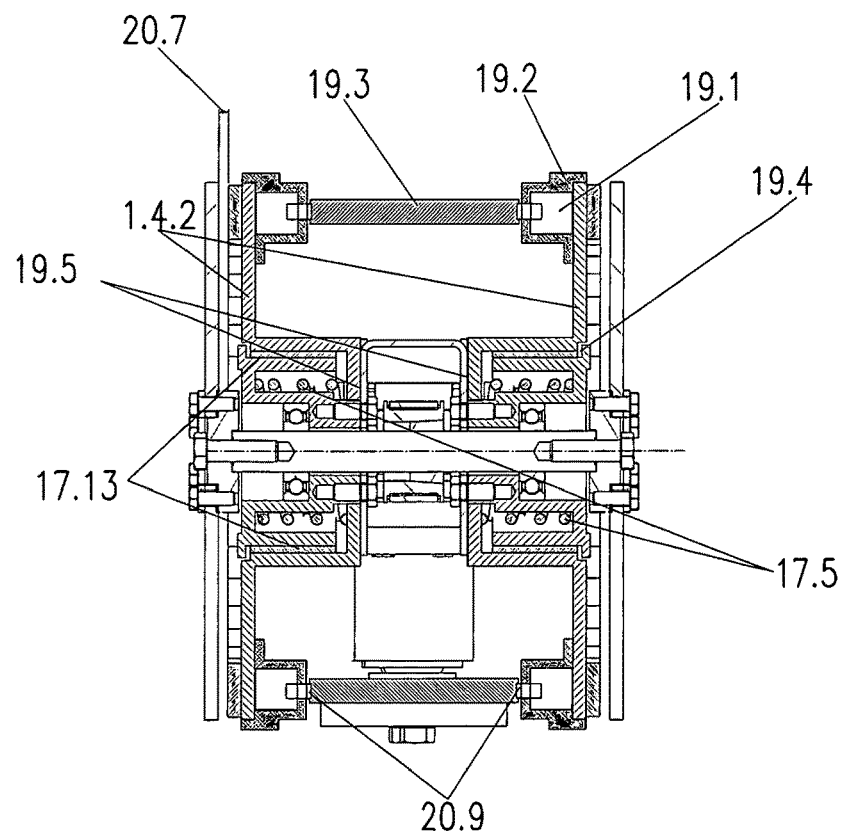
FIG. 18 shows a vibration absorber according to the invention with two eddy current damping arrangements lying opposite one another with integrated temperature compensation.

FIG. 18 shows a vibration absorber according to the invention with two eddy current damping arrangements (1.4) lying opposite one another with integrated temperature compensation. Since the power of the magnets decreases with increasing temperature, it is sensible to incorporate a temperature compensation. This is positioned between the magnet support plates. The thermostat actuator (19.1) expands, for example, at a temperature of 50° C. and forces the magnet support plates (magnet elements 1.4.2) apart against the force of the springs (17.5) until they hit the stop (19.4). The actuator is an element in accordance with the prior art which utilises the change in volume during a phase change of an element (for example wax) in order to carry out a movement depending on the temperature. The magnets consequently come closer to the conductor disc. This in turn has the effect that the air gap (17.11) becomes smaller and the eddy current function is thus enhanced and thus the drop in power caused by the high temperature is compensated. At colder temperatures, the thermostat actuators contract again and the magnet elements (1.4.2) lie against the inner contact surface (19.5). The movement takes place via the sliding elements (19.6)

Figure 19:
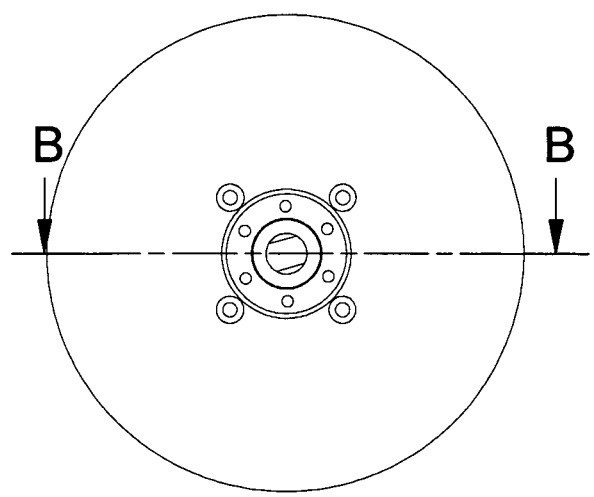
FIGS. 19 and 20 show further variants for temperature compensation with FIG. 19 showing the element in the cold state and FIG. 20 shows the element in the warm, compensate state.
Figure 19:
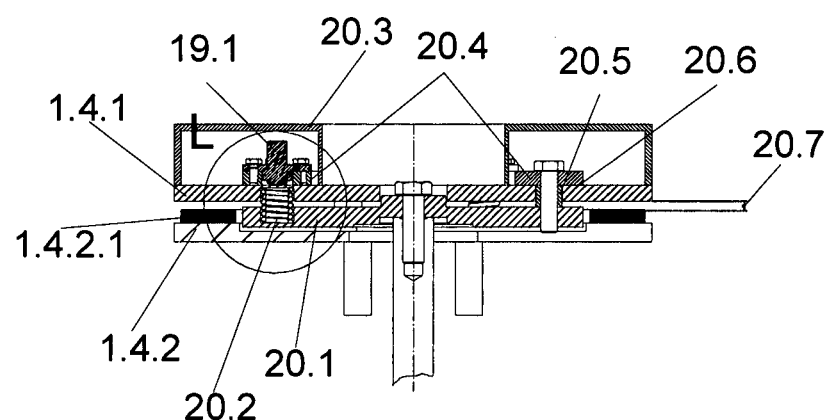
Figure 19:
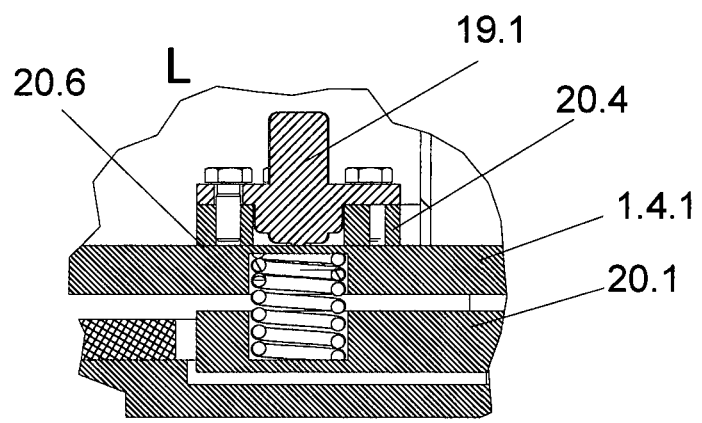
Figure 20:
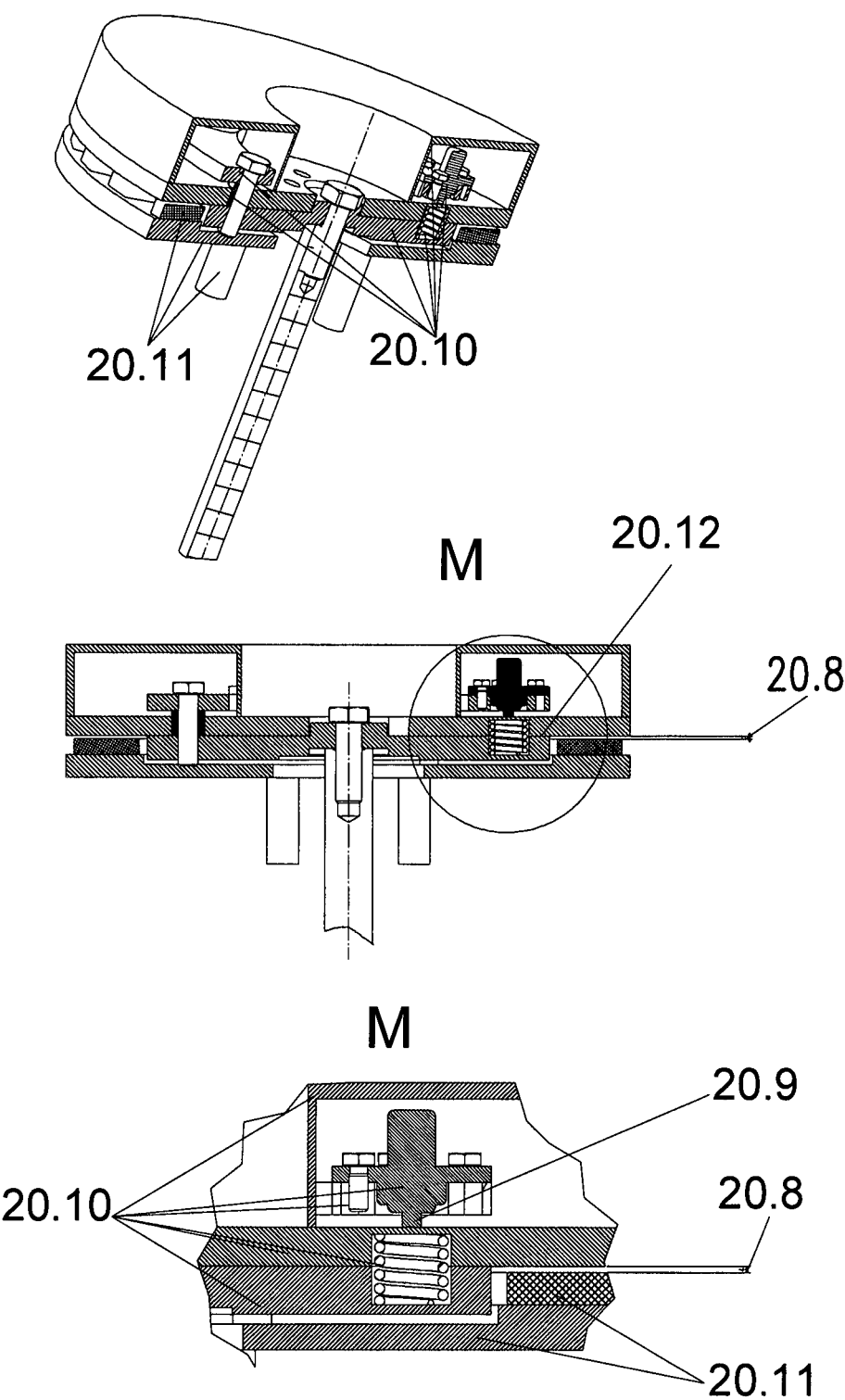

FIGS. 19 and 20 show a further variant for temperature compensation is described below for the rotating region. This has the advantage over the arrangement described in FIG. 19 that the actuator experiences the temperature of rather hotter conductor disc and more precise regulation is thus possible.

FIG. 19 and FIG. 20 show the rotating and fixed elements detached from the entire rotation damper. FIG. 19 shows the element in the cold state and FIG. 20 shows it in the warm, compensate state.

In this design, the rotating conductor disc is forced at relatively high temperature (for example 60° C.) in the direction of the magnet disc against the force of the magnets (20.2) by means of a plurality of actuators (19.1) mounted on the periphery. Until they come into contact with the warm-state stop (20.12).

On cooling, for example at temperatures below 60°, the conductor disc is pushed away from the magnet disc by the force of the springs (202) until it comes into contact with the cold-state stop (20.6). The damping increased by cold temperatures is thus throttled hack.

List of reference numerals:

| | | |
|---|---|---|
| 1 | Damping arrangement | |
| | 1.1 | Rotating (first) element |
| | | 1.1.1 Fan, fan blade/cooler |
| | 1.2 | Fixed (second) element |
| | 1.3 | Damping arrangement (general) |
| | 1.4 | Eddy current damping-damping arrangement (elements) |
| | | 1.4.1 Conductor element/conductor plate |
| | | 1.4.1.1 Conductor element on support |
| | | 1.4.2 Magnet element |
| | | 1.4.2.1 Magnetic elements on support |
| | | 1.4.3 Ferromagnetic element |
| | | 1.4.4 First magnet disc  1.4.5 Second magnet disc |
| | | 1.4.6 Conductor disc |
| | | 1.4.7 Support for magnets (centrifugal force dampers) |
| | | 1.4.8 Magnet elements (centrifugal force dampers) |
| | | 1.4.9 Conductor element, (centrifugal force dampers) |
| | | 1.4.10 Air gap |
| | | 1.4.11 Centrifugal force masses |
| | | 1.4.12 Shaft with support plate |
| | | 1.4.13 Restoration spring with joints |
| | 1.5 | Damping elements frictional damping |
| | | 1.5.1 Rotating plate with shaft |
| | | 1.5.2 Brake drum-fixed element |
| | | 1.5.3 Centrifugal force masses |
| | | 1.5.4 Restoration spring with joints |
| | | 1.5.6 Brake lining |
| | 1.6 | Fluid damping arrangement |
| | 1.7 | Magnetic damping arrangement (conventional) |

-continued

| List of reference numerals: |
|---|

2 Transport device
    2.1          Running belt, running band, toothed belt
    2.2          Transport rollers/wheels/toothed wheels
         2.2.1        Drive wheel for rotating element 1.1
    2.3          Rolling/sliding device
         2.3.1        Carriage
         2.3.2        Running rails
         2.3.3        Rolling track
         2.3.4        Sliding part/sliding arrangement
    2.4          Toothed rack
    2.5          Spindle/ball spindle
3 Connecting element
    3.1          Attachment/fixing to 2.1, 2.4, 2.5
    3.2          Joint connection to transport device
         3.2.1        Swivel/tilt joint
    3.3          Joint connection to swinging mass 5
         3.3.1        Rotating or ball joint
4 Supporting construction
5 Common shaft for drive wheel 2.2.1 and rotating element 1.1
    5.1          Bearing for shaft
6 Joint connection between supporting construction (4) and structure to be damped
7 Swinging (in operation) mass
8 Mass suspension
    8.1          Pendulum rod/pendulum cable
9 Structure to be damped (tower, building)
10 Damping device comprises (1), (2) (3) and (4)
11 Erection construction
12 Tandem disc
    12.1 Outer conductor disc (1.4.6)
    12.2. Inner conductor disc
    12.3 Rotating connection of the conductor discs
    12.4. Magnet disc with magnets on both sides
13 Locking pin
    13.1 Retaining device for locking pin
14 Springs for frequency adaptation
    14.1. Spring connection to transport device (2)
    14.2. Spring connection to supporting construction (4)
    14.3 Oblong hole for spring movement
15 Rotation - pitch unit
    15.1 Elastomer element for yaw movement
    15.2 Elastomer element for pitch movement
    15.3 Attachment element of the damper unit
    15.4 Attachment of 15.2
    15.5 direction of the yaw movement
    15.6 Direction of the pitch movement
17 Adjustment device for travel-dependent damping
    17.1 Adjustment device
    17.2 Spring holding element
    17.3 Adjustment cams
    17.4 Adjustment curves on adjustment device
    17.5 Restoration spring element
    17.6 Brake lining
    17.7 Brake friction lining (optional)
    17.8 Rotation inhibition
    17.9 Rotating and axially fixed region
    17.10 Non-rotating and axially movable region
    17.11 Magnet-conductor disc separation
    17.12 Brake disc separation
    17.13 Sliding bushing
    17.14 Running rollers (not depicted)
18 Supplementary disc brake
    18.1 Brake caliper
    18.2 Brake caliper fixing
19 Temperature compensation device
    19.1 Thermostat actuator
    19.2 Insulation
    19.3 Connection to pressure transmission
    19.4 Movement limitation
20 Temperature compensation device
    20.1 Spring supporting plate
    20.2 Compression spring
    20.3 Housing
    20.4 Actuator support
    20.5 Spacer
    20.6 Cold-state stop
    20.7 Cold-state air gap
    20.8 Warm-state air gap -continued

| List of reference numerals: |
|---|
| 20.9 Actuator |
| 20.10 Rotating components |
| 20.11 Fixed components |
| 20.12 Warm-state stop |

The invention claimed is:

1. A vibration absorber arrangement suitable for damping vibrations which occur in a structure to be dampened of a wind turbine, a tall installation or a building, or during erection thereof, comprising:
at least one swinging mass (7) on a pendulum rod or pendulum cable (8),
a damping device (10) which is connected to the swinging mass and to the structure to be damped, where the damping device (10) comprises:
(i) a supporting construction (4),
(ii) a transport device (2) which
is accommodated on or in the supporting construction (4),
is connected to the swinging mass (7),
is moved linearly to-and-fro in one direction between end stop points on excitation by the swinging mass (7), and
is capable of converting the linear to-and-fro movement into a rotational movement,
(iii) an articulated connecting first element (3) which is attached to the transport device (2) and is connected to the swinging mass (7) or to the structure (9) to be damped, and an articulated connecting second element (6) which is connected to the supporting construction (4) and to the structure (9) to be damped, when the swinging mass (7) is connected to the connecting first element (3), or when the structure (9) to be damped is connected to the connecting first element (3), so that, on relative movement of the swinging mass (7) with respect to the structure (9) to be damped, the transport device (2) moves linearly to-and-fro between the end stop points, and
(iv) at least one damping arrangement (1), which is responsible for actual damping, is functionally connected to the transport device (2) and essentially comprises:
at least one rotary element (1.1) which rotates in operation,
at least one fixed element (1.2), which is arranged opposite the rotary element and is connected to the supporting construction (4), and
damping elements (1.3) arranged between the rotary and the fixed elements, where damping occurs due to the relative rotational movement of the rotary element (1.1) with respect to the element (1.2), and the rotating rotary element (1.1) is driven by a corresponding linear movement of the transport device (2),
wherein
(v) the transport device (2) comprises:
a running belt or running band (2.1),
at least first and second transport rollers (2.2), where at least the first transport roller serves as a drive wheel (2.2.1) for the rotating rotary element (1.1), over which the running belt or running band is guided in a circulating manner, and
a rolling or sliding device (2.3) against which the connecting first element (3) lies during the linear to-and-fro movement in operation or is guided thereby with it in the process, and
(vi) the rotary element (1.1) which rotates in operation is a disc, a wheel or an internal gearwheel, and the fixed element (1.2) is a disc, a wheel, an internal gear wheel, a ring or a part thereof which is designed and arranged correspondingly in relation to the rotating rotary element (1.1).

2. The vibration absorber arrangement of claim 1, wherein the rolling or sliding device (2.3) comprises a supporting roller device or a carriage (2.3.1), which is moved on one or more running rails (2.3.2) or a track (2.3.3) and to which the connecting first element (3) is attached.

3. The vibration absorber arrangement of claim 1, wherein the connecting first element (3) has at least one joint (3.2) at a connecting point to the transport device (2) and is thereby swivelled about an imaginary axis transverse to the transport device (2).

4. The vibration absorber arrangement of claim 1, wherein the connecting first element (3) has, at a connecting point to the swinging mass (7) or the structure (9) to be damped, a pivot joint or ball joint (3.3) and/or an elastomer bushing joint (15)(15.1)(15.2) which allows yaw and pitch movements.

5. The vibration absorber arrangement of claim 1, wherein the rotating rotary element (1.1) is driven by a shaft (5), which also drives the first transport roller (2.2)(2.2.1) for the running belt or running band (2.1) of the transport device (2).

6. The vibration absorber arrangement of claim 1, wherein the end stop points of the transport device (2) are adjustable depending on the movement of the swinging mass (7), and are selectable so that a damping effect is greater in a region of reversal points of the moved swinging mass (7) than when the swinging mass passes through a lowermost point of a track curve with a greatest speed.

7. The vibration absorber arrangement according to claim 1, wherein the vibration absorber arrangement has a locking device (13) between the supporting construction (4) and the transport device (2) which prevents the transport device (2) from being moved by the swinging mass (7).

8. The vibration absorber arrangement of claim 1, wherein the vibration absorber arrangement has, for frequency adaptation, a spring device (14)(14.1)(14.2)(14.3) which is installed in such a way that the transport device (2) and the damping arrangement (1) are tensioned against one another.

9. The vibration absorber arrangement of claim 1, wherein the damping arrangement (1) of the damping device (10) is an eddy current damping arrangement (1.4) comprising a conductor element (1.4.1) and a magnetic element (1.4.2), said conductor and said magnetic elements being separated by an air gap (1.4.10).

10. The vibration absorber arrangement of claim 9, wherein the rotary element (1.1) of the damping arrangement (1), which rotates in operation, is a first disc or a support disc, and the fixed element (1.2) of the damping arrangement (1) is a second disc or a support disc, where the first and the second discs or the support discs are arranged parallel to one another.

11. The vibration absorber arrangement of claim 10, wherein the first disc (1.1) is the conductor element or has conductor elements (1.4.1), and the second disc (1.2) is the magnetic element or has magnetic elements (1.4.2), where the magnetic elements are located on a side surface of the second disc opposite the first disc.

12. The vibration absorber arrangement of claim 10, wherein the first disc (1.1) is the magnetic element or has magnetic elements (1.4.2), and the second disc (1.2) is the conductor element or has conductor elements (1.4.1), where the magnetic elements (1.4.2) are located on a side surface of the first disc opposite the second disc.

13. The vibration absorber arrangement according to claim 9, wherein the rotary element (1.1) of the damping arrangement (1), which rotates in operation, is the wheel, the internal gear wheel or a disc part which has a ring-shaped conductor element (1.4.1) on a periphery thereof, and the fixed second element (1.2) has the magnetic element (1.4.2) which extends over and has been pushed over the rotating rotary element (1.1) or has a corresponding ring element as support (1.4.2.1), on an inner ring surface of which the magnetic elements are arranged while a constant air gap (1.4.10) with the rotating rotary element (1.1) is maintained.

14. The vibration absorber arrangement of claim 9, wherein the rotary element (1.1) of the damping arrangement (1), which rotates in operation is the wheel, the internal gear wheel or a disc part which has on a periphery thereof a magnetic ring or magnetic elements (1.4.2) on a ring-shaped support (1.4.2.1), and the fixed element (1.2) is a ring-shaped conductor element (1.4.1) which extends over and has been pushed over the rotating rotary element (1.1) while a constant air gap (1.4.10) with the rotating rotary element is maintained.

15. The vibration absorber arrangement of claim 9, wherein the damping device (10) has at least one adjustment device (17) which is moved by the transport device (2) and by which the damping by the eddy current damping arrangement (1.4) is adjustable in a variable manner depending on a swing travel of the swinging mass (7), or a linear travel of the transport device (2), by a reduction or an increase of the air gap (1.4.10) between the conductor element (1.4.1) and the magnetic element (1.4.2).

16. The vibration absorber arrangement of claim 15, wherein the adjustment device (17) has adjustable profile curves (17.4) and a recovery spring element (17.5), where the profile curves are arranged to push the conductor element, which is a conductor plate, (1.4.1) and the magnetic element, which is a magnetic plate, (1.4.2) closer to one another directly or via adjustment cams (17.3) mounted on the damping arrangement (1.4), with reduction of the air gap (1.4.10) between the conductor and the magnetic plates when the swinging mass (7) swings out and are returned to a starting position again by the recovery spring element when the swinging mass swings back.

17. The vibration absorber arrangement of claim 9, wherein the damping device (10) comprises a device for temperature compensation (19)(20) by reduction or increase of the air gap (1.4.10) between the conductor element (1.4.1) and the magnetic element (1.4.2).

18. The vibration absorber arrangement of claim 9, wherein the eddy current damping arrangement (1.4) has a ferromagnetic element (1.4.3), which is connected to the conductor element (1.4.1) on a side facing away from the the magnetic element (1.4.2) and is moved against the conductor element (1.4.1) by centrifugal force depending on a speed of rotation and is separated from the conductor element again so that additional damping which is dependent on the speed of rotation is achieved.

19. The vibration absorber arrangement of claim 1, wherein the damping arrangement (1) of the damping device (10) is a frictional damping arrangement (1.5).

20. The vibration absorber arrangement of claim 1, wherein the damping arrangement (1) of the damping device (10) is a fluid damper arrangement (1.6).

21. The vibration absorber arrangement of claim 1, wherein the damping arrangement (1) of the damping device (10) is a conventional magnetic damping arrangement (1.7).

22. A wind turbine comprising:
a tower (9),
a nacelle with a rotor and rotor blades,
wherein the wind turbine has at least one vibration absorber arrangement according to claim 1.

\* \* \* \* \*